US012645276B2

(12) United States Patent (10) Patent No.: US 12,645,276 B2

Gendler et al. (45) Date of Patent: Jun. 2, 2026

(54) FABRIC DATA RATE LIMITING PROPORTIONAL TO ELECTRICAL CURRENT THRESHOLD VIOLATIONS

(71) Applicant: Apple Inc., Cupertino, CA (US)

(72) Inventors: Alexander Gendler, Kiriat Ata (IL); Samer Nassar, Haifa (IL); Lior Zimet, Kerem Maharal (IL); Tzach Zemer, Haifa (IL)

(73) Assignee: Apple Inc., Cupertino, CA (US)

( * ) Notice: Subject to any disclaimer, the term of this patent is extended or adjusted under 35 U.S.C. 154(b) by 90 days.

(21) Appl. No.: 18/883,268

(22) Filed: Sep. 12, 2024

(65) Prior Publication Data

US 2026/0072489 A1 Mar. 12, 2026

(51) Int. Cl.
G06F 1/30 (2006.01)

(52) U.S. Cl.
CPC ..................................... G06F 1/30 (2013.01)

(58) Field of Classification Search
CPC ........................................................ G06F 1/30
See application file for complete search history.

(56) References Cited

U.S. PATENT DOCUMENTS

| | | | |
|---|---|---|---|
| 9,652,026 B2 | 5/2017 | Park et al. | |
| 9,817,469 B2 | 11/2017 | Lee | |
| 9,881,112 B1 | 1/2018 | Zhang et al. | |
| 11,579,934 B2 | 2/2023 | Andrus et al. | |

| | | | |
|---|---|---|---|
| 2014/0086070 A1* | 3/2014 | Saund | G06F 13/1605 |
| | | | 370/252 |
| 2016/0041608 A1 | 2/2016 | Lee | |
| 2016/0337223 A1* | 11/2016 | Mackay | H04L 43/0894 |

(Continued)

FOREIGN PATENT DOCUMENTS

| | | |
|---|---|---|
| CN | 109842138 A | 6/2019 |
| CN | 112363609 A | 2/2021 |

(Continued)

OTHER PUBLICATIONS

International Search Report and Written Opinion in PCT Appl. No. PCT/US2025/045068 mailed Dec. 22, 2025, 8 pages.

*Primary Examiner* — Michael Alsip

(74) *Attorney, Agent, or Firm* — Kowert, Hood, Munyon, Rankin & Goetzel, P.C.; Michael B. Davis; Dean M. Munyon

(57) ABSTRACT

Disclosed techniques relate to limiting a data rate of communications on fabric circuitry proportionally to a violation of a power-related threshold. Toggle rate detector circuitry, measuring a toggle rate between a given interface circuit and the fabric circuitry, may be distributed at interfaces that couple the fabric circuitry and multiple client circuits. Power control circuitry may generate an estimate of electrical current use by a given client circuit based on a toggle rate between the client circuit's interface and the fabric circuitry and based on a communication event. The power control circuitry may detect, based on the estimates of electrical current use, a violation of an electrical current threshold. Additionally, the power control circuitry may limit the data rate of communications on the fabric circuitry, proportionally to a magnitude of the violation. Disclosed techniques may mitigate violations with reduced impacts on performance relative to traditional techniques.

20 Claims, 13 Drawing Sheets

(56) References Cited

U.S. PATENT DOCUMENTS

| | | | |
|---|---|---|---|
| 2021/0041929 A1* | 2/2021 | Connor | G06F 1/3253 |
| 2021/0117249 A1 | 4/2021 | Doshi et al. | |
| 2023/0079292 A1 | 3/2023 | Raina et al. | |
| 2023/0205304 A1 | 6/2023 | Man et al. | |
| 2023/0334003 A1 | 10/2023 | Tolchinsky et al. | |
| 2023/0401164 A1* | 12/2023 | Kruse | G06F 12/1416 |
| 2025/0044844 A1* | 2/2025 | Rajwan | G06F 1/324 |

FOREIGN PATENT DOCUMENTS

| | | | |
|---|---|---|---|
| CN | 117827466 A | 4/2024 |
| JP | 4595514 B2 | 12/2010 |
| JP | 2020092512 A | 6/2020 |

* cited by examiner

One or more integrated circuit dies 100

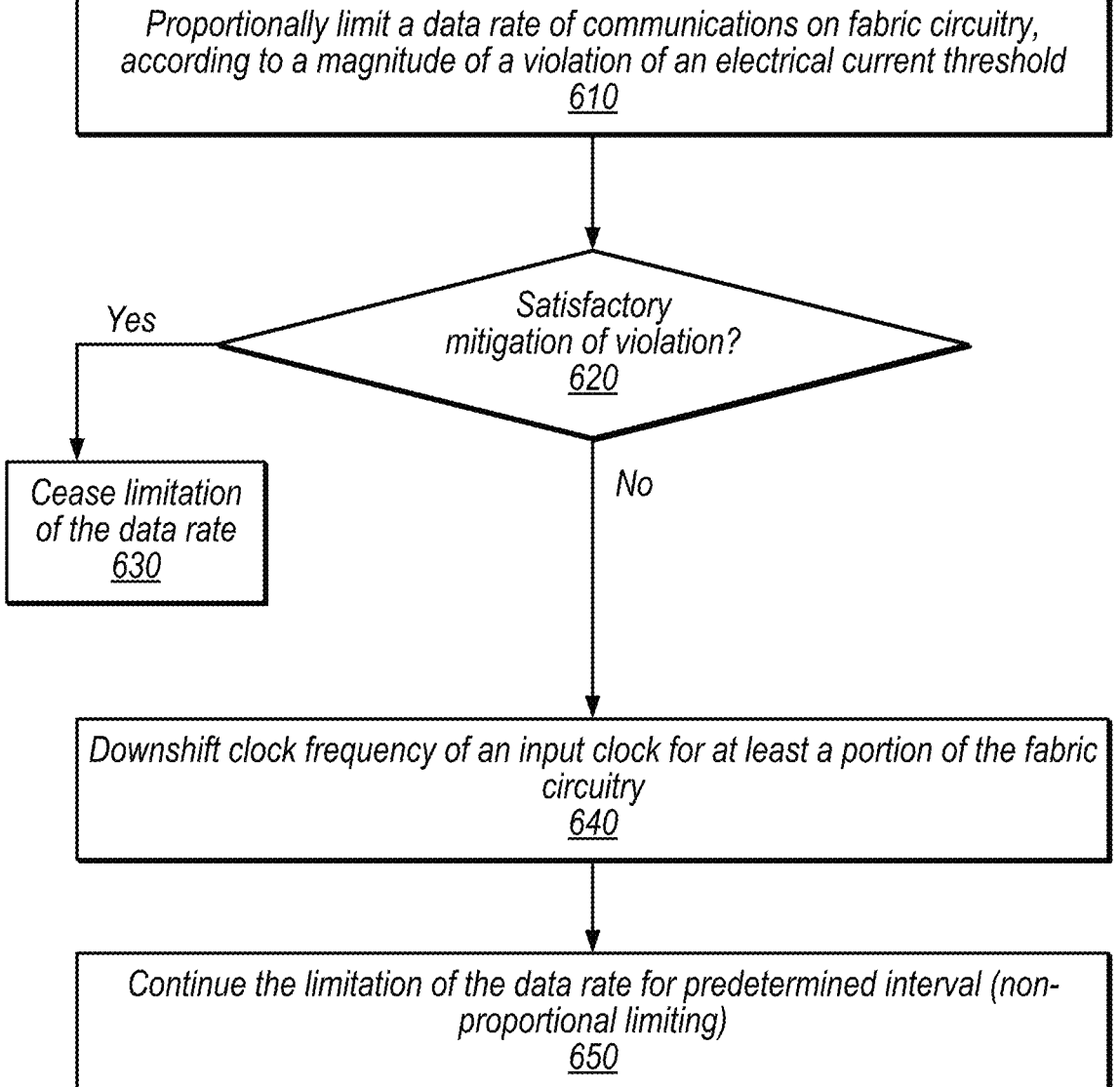

*Proportionally limit a data rate of communications on fabric circuitry, according to a magnitude of a violation of an electrical current threshold*
*610*

*Satisfactory mitigation of violation?*
*620*

*Yes*

*No*

*Cease limitation of the data rate*
*630*

*Downshift clock frequency of an input clock for at least a portion of the fabric circuitry*
*640*

*Continue the limitation of the data rate for predetermined interval (non-proportional limiting)*
*650*

Generate, for a given client circuit of multiple client circuits configured to communicate via fabric circuitry, an estimate of electrical current use by the given client circuit based on: a toggle rate measured at an interface between the given client circuit and the fabric circuitry and one or more communications events associated with activity of the given client circuit on the fabric circuitry.
*1010*

Detect, based on the generated estimates for the multiple client circuits, a violation of an electrical current threshold
*1020*

Limit a data rate of communications on the fabric circuitry, proportionally to an amount of the violation of the electrical current threshold
*1030*

FIG. 10

FABRIC DATA RATE LIMITING PROPORTIONAL TO ELECTRICAL CURRENT THRESHOLD VIOLATIONS

BACKGROUND

Technical Field

This disclosure relates generally to power management for integrated circuits and more particularly to data rate limits for communications fabric circuitry.

Description of Related Art

Modern computing devices often include a variety of components that may or may not be active for given tasks. Further, a given component may operate under substantially different workloads at different times. A computing device also may operate in different conditions (e.g., temperatures) and use different power sources (e.g., battery power or a wired power supply).

Power management circuitry may limit operations by certain circuits based on inputs such as current draw, supply voltage level, temperature measurements, etc. Efficient power management may maintain satisfactory performance while avoiding overheating, poor battery life, or other unfavorable conditions.

BRIEF DESCRIPTION OF DRAWINGS

FIG. 6 is a flow diagram illustrating example fallback to non-proportional mitigation techniques, according to some embodiments.

FIG. 10 is a flow diagram illustrating an example method, according to some embodiments.

DETAILED DESCRIPTION

Figure 1:
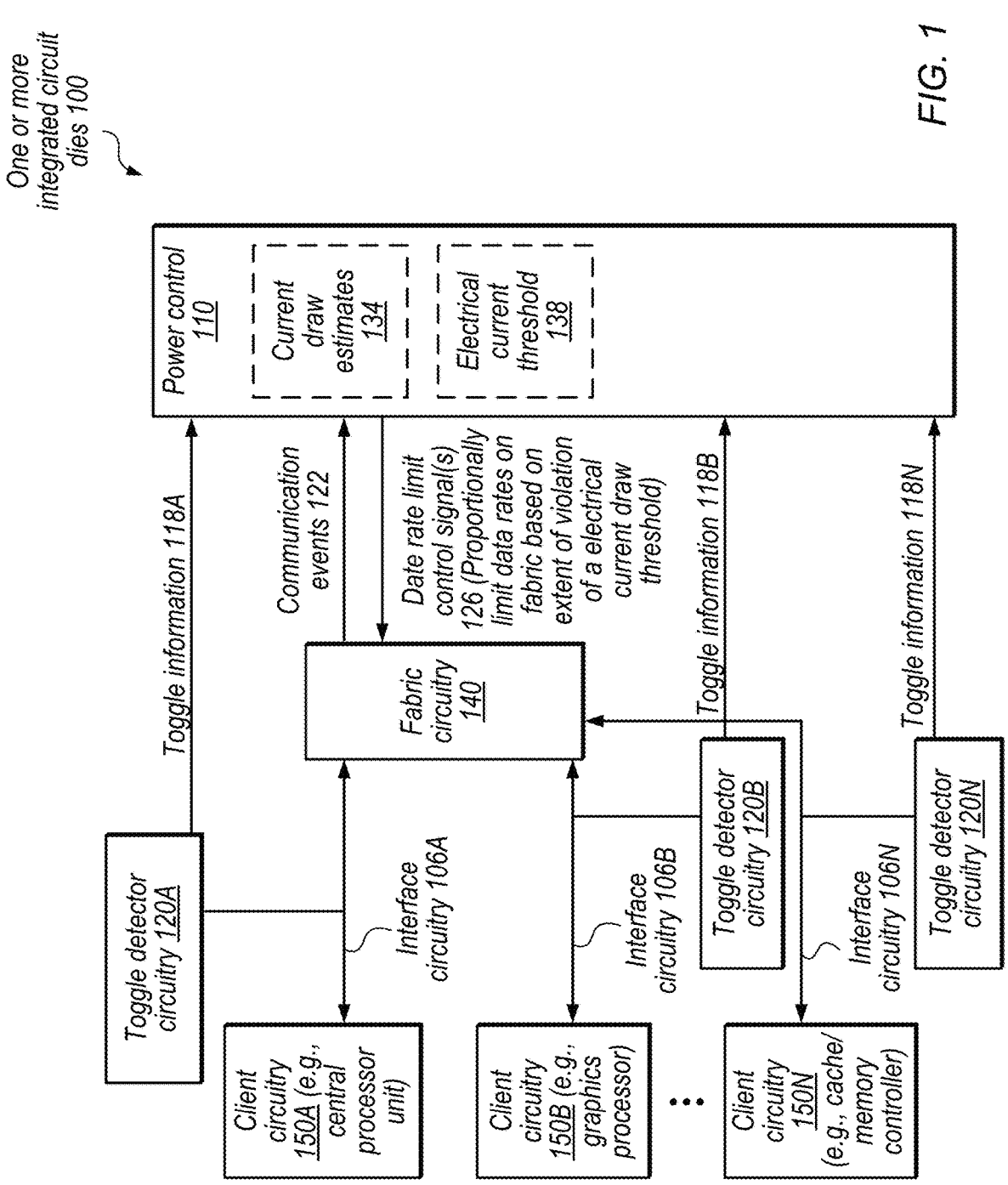
FIG. 1 is a block diagram illustrating an example circuit configured to implement proportional data rate control, according to some embodiments.

Computing devices often include various components (e.g., central processing units, graphics processing units, display units, machine learning accelerator units, etc.), some of which may be included in one or more integrated circuit dies of a system-on-a-chip (SOC). Occasionally, power drawn by one or more of the components from a power supply may exceed one or more operating parameters of the power supply. Thus, the power supply may provide inadequate power, causing voltage droops. When this occurs over a period of time, the performance of the computing device may be degraded, computation errors may occur, and, in some cases, the computing device may be damaged.

To mitigate performance degradation, reduce or avoid computation errors associated with timing failures, and avoid damage, power control circuitry may detect a power event indicative of an excursion from one or more operating parameters. For example, detection circuitry such as a toggle rate detector may be positioned at an interface between a frequently accessed component, such as a memory controller, and fabric circuitry through which the frequently accessed component and other components communicate. In response to detection of the excursion, power control circuitry may perform a mitigation operation. This may include limiting a data rate of communications on the fabric circuitry, reducing toggle rate, and downshifting (e.g., reducing) a clock frequency of an input clock for the fabric circuitry.

Some such centralized detection techniques may reduce or avoid errors and equipment damage, but may detect excursions substantially after the causative events (e.g., at client circuitry on the other side of the fabric) have occurred. Additionally, power conservation operations may be traditionally performed independently of the magnitude of the excursion. For example, an excursion that occurs for a relatively short time period may be treated similarly to a more extensive excursion that occurs over a longer time period. Power conservation operations may negatively affect operational performance of the components and, by extension, the overall SOC.

Therefore, in disclosed embodiments, discussed in detail below, detection circuitry may be distributed, e.g., at or near the edges of the communications fabric. Further, power management circuitry may implement power mitigation control operations that are proportional to an extent of a power threshold violation. This may advantageously provide adequate mitigation of power events with reduced performance impacts, relative to traditional techniques.

As specific examples, distributed power estimator circuitry may estimate current draws based on toggle rate detectors (on the fabric side of interfaces with various clients) and bandwidth estimates (that are based on communication events associated with various clients via the fabric). Power control circuitry may generate an aggregated electrical current draw estimate based on estimates from the distributed power estimator circuitry and compare the aggregated current draw estimates to one or more thresholds. In response to violation of a threshold, the power control circuitry may limit data rates on the fabric circuitry, proportionally to the amount of the violation. The data rate limits may use quality-of-service (QoS)-aware limiting techniques, e.g., as described in U.S. patent application Ser. No. 18/365,783 titled "Quality-of-Service-Based Fabric Power Management," which is incorporated herein by reference in its entirety and discussed in detail below.

These embodiments may provide a more accurate, precise, and timely identification of an electrical current threshold violation, relative to conventional techniques. This in turn may facilitate timely initiation of a proportional data rate limiting operation to mitigate or, in some cases, prevent the excursion before the excursion occurs. Corresponding performance improvements may improve user experiences while protecting equipment, in some embodiments.

In some embodiments, as part of the proportional response to a current threshold violation, power control circuitry may downshift clock frequency for certain client circuits, proportionally to the magnitude of the violation. For example, the power control circuitry may downshift only the frequency of clients with limited (or no) real-time (RT) data traffic on the fabric.

In some embodiments, the power control is configured to perform a fallback control procedure, e.g., based on detecting that proportional limitation of a data rate of communications on fabric circuitry is inadequate to satisfy one or more criteria for addressing the excursion. The fallback control procedure may include extending the duration of data rate limits and downshifting a clock frequency of an input clock for at least a portion of the fabric circuitry, for example.

Overview of Proportional Data Rate Limiting

FIG. 1 is a block diagram illustrating example circuitry configured to implement proportional data rate control, according to some embodiments. As depicted in FIG. 1, power control 110 is configured to proportionally limit a data rate of communications on fabric circuitry 140 based on current draw estimates 134, which are generated based on information reported by one or more instances of client circuitry 150A-150N and communication events 122 on the fabric circuitry 140 (e.g., events associated with clients such as certain types of requests, acknowledgement, etc.). The data rate limitation may be "proportional" in the sense that the limitation is commensurate with a magnitude of a violation of electrical current threshold 138. The magnitude of the violation of electrical current threshold 138 may correspond to the duration of the violation, the extent to which current usage exceeds electrical current threshold 138, some other attribute of the violation, or some combination thereof.

As FIG. 1 illustrates, one or more integrated circuit dies 100 include client circuitry 150A-150N, interface circuitry 106A-106N, toggle detector circuitry 120A-120N, fabric circuitry 140, and power control 110. Instances of interface circuitry 106A-106N communicatively couple respective instances of client circuitry 150A-150N to fabric circuitry 140.

Client circuitry 150A-150N, in some embodiments, corresponds to different types of components associated with one or more integrated circuit dies 100. In the illustrated example, client circuitry 150 includes a central processing unit, a graphics processor, and a cache/memory controller, although various other clients are contemplated.

Different clients of client circuitry 150A-150N may communicate using different sets of data traffic types. For example, fabric circuitry 140 may support a set of traffic classes (e.g., real time (RT), low latency (LLT), isochronous (ISOC), and bulk, in some embodiments). Different client circuits 150 may support different subsets of these traffic classes and may utilize different ratios of traffic classes at different times. Accordingly, limitation of a data rate for a given traffic class by fabric circuitry 140 may have different effects on performance of different clients. It may be desirable to impose different data limiting on different traffic classes, as discussed in the '783 application (e.g., to reduce impacts on traffic such as RT traffic that may directly contribute to user experience).

Fabric circuitry 140, in some embodiments, facilitates communication among client circuitry 150A-150N. Fabric circuitry 140 may include switch circuitry that is shared by multiple virtual channels (VCs), different queue circuits for different VCs, and arbitration circuitry configured to arbitrate among the different queue circuits. VCs are channels that physically share a network but which are logically independent on the network. Fabric circuitry 140 may include separate VCs for different traffic classes, e.g., for RT, ISOC, and bulk data traffic, which may have different quality of service (QoS) parameters. Example QoS parameters include latency, bandwidth, periodicity, etc. Queue circuits may be associated with different QoS traffic types carried by the VCs.

Toggle detector circuitry 120A-120N, in some embodiments, is distributed at different interface circuits 106A-106N and is configured to measure toggle information 118A-118N on the fabric side of given interface circuitry 106A. Toggle information 118A-118N indicates the number of data bits that are different between cycles (e.g., switched from 0 to 1 or 1 to 0). For example, given toggle detector 120 may determine the difference between data on given interface circuitry 106A-106N and data in fabric circuitry 140 that was received in a previous cycle. As another example, toggle detector circuitry 120A-120N may store previous data value(s) from any given client circuitry of client circuitry 150A-150N, measured at given interface circuitry of interface circuitry 106A-106N, and use the stored data to compare data from different cycles. Example circuit implementations of toggle detector circuitry 120 are discussed in detail below with reference to FIGS. 7 and 8.

Power control 110, in some embodiments, is configured to proportionally limit data rates on fabric circuitry 140, e.g., based on the difference between current draw estimates 134 and the electric current threshold 138. More detailed example embodiments of power control 110 are discussed below with reference to FIGS. 2 and 3. In various embodiments, disclosed techniques may advantageously maintain performance of fabric circuitry 140 while reducing or avoiding problems associated with power events such as current spikes.

Power control 110 is configured generate, for given client of client circuitry 150A-150N, an estimate of electrical current use by the client, in some embodiments. In the illustrated example, power control circuitry 110 stores these current draw estimates at 134 (e.g., individually or as an aggregated value). These estimates are based on both toggle information 118A-118N and one or more communication events 122 associated with activity of given client on fabric circuitry 140.

The communication events 122 may include various events detectable by power control circuitry 110 via fabric circuitry 140 that may impact a client's current draw. Note that these events may be based on internal processing operations that are not visible to power control 110. Communication events 122 may include, for example: memory access requests by given client, valid packets transmitted by a given client, or both. Note that communication events 122 may be associated with multiple clients 150 and may be separately tracked for different clients, as discussed in detail below with reference to FIG. 2. An advantage of estimating current usage of clients based on communication events (e.g., communication events 122) is that power control 110 does not require clients to report their current draft directly, but rather allows power control 110 to estimate current draw based on visible events relating activity level of a given client on the fabric.

Based on current draw estimates 134, power control 110 may be configured to detect a violation of electrical current threshold 138. This may indicate that a corrective action should be taken to avoid undesirable events such as incorrect processing outputs (e.g., due to supply voltage being insufficient to meet timing requirements), equipment damage, etc. Power control 110 may compare current draw estimates 134 and electrical current threshold 138. (This comparison may be of aggregated estimates or individual client estimates). In response to current draw estimates 134 meeting electrical current threshold 138 (e.g., matching the threshold or exceeding below the threshold, in some embodiments), power control 130 may detect a violation of electrical current threshold 138 and initiate one or more corrective actions, including the proportional data rate limit control signals 126.

Note that current draw estimates 134 may meet the current threshold 138 in various scenarios, e.g., due to user activities that cause a large number of clients to perform intensive tasks at the same time. For example, a malicious software program that attempts to activate multiple clients to cause equipment damage may cause current threshold 138 to be met.

Distributing toggle detector circuitry 120A-120N at interface circuitry 106A-106N may advantageously facilitate rapid, accurate, and precise detection of a violation of electrical current threshold 138. Distributed detection may provide better granularity in identifying which clients are drawing large amounts of current and may also allow detection or prediction of excursions earlier (e.g., relative to more centralized toggle detection). In this way, current draw estimates 134 may be more representative of an operating state of one or more integrated circuit dies 100 than would be the case through use of conventional techniques.

Data rate limit control signal(s) 126 may specify a limitation of a data rate of communications on fabric circuitry 140 that is proportionally to a magnitude of the violation of electrical current threshold 138. For example, power control 110 may impose a greater limit or impose the limit for a greater amount of time if the violation of the electrical current threshold 138 has a greater magnitude or persists longer. For example, in response to detection of current draw estimates 134 that exceed electrical current threshold 138 by a specified factor (e.g., 2×, 3×, etc.) stored in a memory of one or more integrated circuit dies 100, power control 110 may be configured to impose larger limits on a data rate of communications on fabric circuitry 140 than for current draw estimates 134 that deviate less significantly from electrical current threshold 138. To illustrate, a first violation of electrical current threshold 138 may last for 10 μs and may result in a 0.2 mA violation. A second violation may last for 20 μs and may result in a 0.4 mA violation. In imposing proportional rate limiting, power control 110 may impose a lower data rate, a longer data rate limit interval, or both to mitigate the second violation than to mitigate the first violation. Note that the proportional data rate limit control may utilize QoS-based data rate limitation on fabric circuitry 140 as described with reference to FIG. 2. For example, the rate limiting may impose greater limits on some categories of traffic than others.

Proportional limitation of a data rate on fabric circuitry 140 may advantageously mitigate an excursion while reducing an effect of the data rate limitation procedure on performance of the SOC as compared to conventional data rate limitation techniques. For clients with traffic that is sensitive to data rate limits, limiting the data rate of communications on fabric circuitry 140 proportionally to the magnitude of the excursion may facilitate rapid recovery of operational performance.

Figure 2:
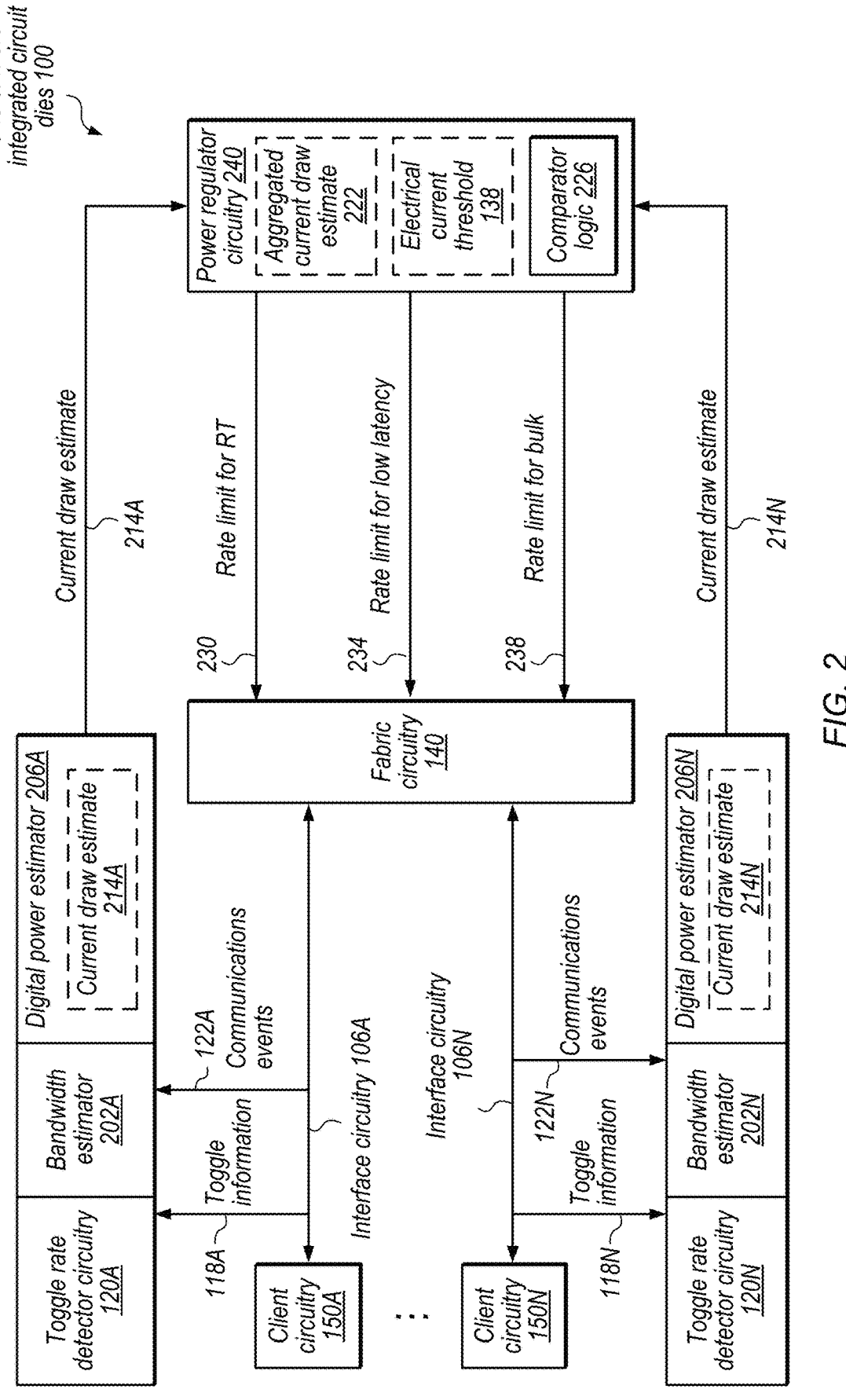
FIG. 2 is a block diagram illustrating one or more integrated circuit dies with example distributed digital power estimator circuitry and example data rate limits for specific data traffic types, according to some embodiments.

Detailed Example Implementation with Distributed Power Estimators and QoS-Based Limiting FIG. 2 is a block diagram illustrating one or more integrated circuit dies with example distributed digital power estimator circuitry and example data rate limits for specific data traffic types, according to some embodiments. Functionality described above for power control 110 is distributed between digital power estimators 206A-206N and power regulator circuitry 240, in this example. As explained below, digital power estimators 206A-206N are configured to generate, for corresponding client circuitry current draw estimates 214A-214N indicating a quantity of electrical current drawn by the given client circuitry. Power regulator circuitry 240 is configured to aggregate the estimates from the distributed digital power estimators 206 (to generate aggregated estimate 222) and proportionally limit data rates on fabric circuitry 140.

FIG. 2 depicts bandwidth estimators 202A-202N, digital power estimators 206A-206N, and power regulator circuitry 240. Additionally, FIG. 2 depicts client circuitry 150A-150N, interface circuitry 106A-106N, toggle rate detector circuitry 120A-120N, and fabric circuitry 140, which may be configured as described with reference to FIG. 1.

For given client, a corresponding bandwidth estimator 202 is configured to estimate, based on communications events 122A-122N, bandwidth of data traffic communicated on corresponding interface circuitry 106A between given client circuitry 150A and fabric circuitry 140. In some embodiments, a bandwidth estimator 202 may include a counter that increments (or that decrements) when the bandwidth estimator 202 detects a memory access request by a client circuitry 150, a valid packet transmitted by a client circuitry 150 on interface circuitry 106, or both. In some embodiments, a bandwidth estimator 202 may maintain separate counters for different events. The counter values may reflect the bandwidth estimates.

Digital power estimator circuitry 206 is configured to generate a current draw estimate 214 corresponding to given client 150 based on both its determined toggle rate 118 provided by a toggle rate detector circuitry 120 and the bandwidth estimate provided by a bandwidth estimator 202. The current draw estimate 214 may be associated with an estimated quantity of power consumed by given client 150. A given digital power estimator 206 may send its current draw estimate 214 to power regulator circuitry 240.

Power regulator circuitry 240 may be configured to aggregate two or more current draw estimates 214A-214N to generate aggregated current draw estimate 222. Comparator logic 226 is configured to compare aggregated current draw estimate 222 and electrical current threshold 138. Aggregated current draw estimate 222 meeting electrical current threshold 138, power regulator circuitry 240 may indicate an excursion from one or more operating parameters of a power supply of one or more integrated circuit dies 100. In some embodiments, aggregated current draw estimate 222 may be a sum of two or more of current draw estimates 214A-214N. In other embodiments, aggregated current draw estimate 222 may be an average of two or more of current draw estimates

214A-214N. In still other embodiments, aggregated current draw estimate 222 may be a weighted average in which current draw estimates associated with certain client circuitry 150A-150N has a greater weight than current draw estimates associated with other client circuitry 150A-150N.

In response to detecting the excursion, power regulator circuitry 240 is configured to limit a data rate of communications on fabric circuitry 140, proportionally to a magnitude of the deviation from electrical current threshold 138. As shown, the proportional rate limiting may be QoS-aware and may impose different rate limits on different virtual channels. These specific VCs are discussed for purposes of illustration but not intended to limit the scope of the present disclosure. Other embodiments may support subsets of these channels, additional channels, etc. Further, similar techniques may be used with non-VCs. As discussed above, the limiting may be proportional in terms of magnitude, length of time, etc., which may improve performance relative to traditional techniques. The QoS-based nature of the limiting may further maintain performance for certain types of traffic that impact user experience, during the proportional mitigation response.

Note that other embodiments may not use distributed bandwidth estimators or digital power estimators, although distributing these elements may improve the accuracy, granularity, and timeliness of current draw estimates. Further, current draw estimates may be separately maintained and compared to thresholds in other embodiments, rather than being aggregated.

Detailed Example of Power Management Circuitry

Figure 3:
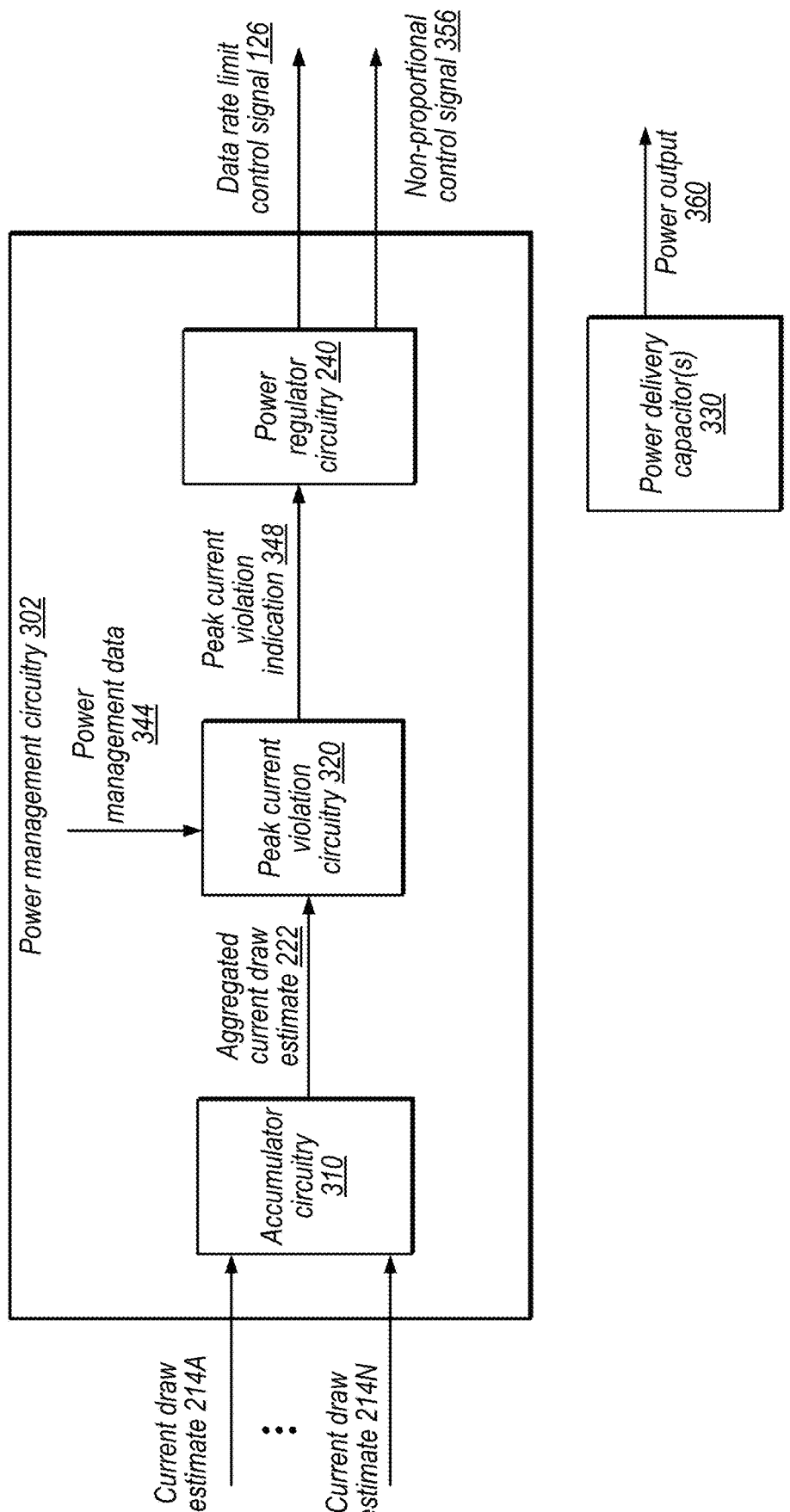
FIG. 3 is a block diagram illustrating example power management circuitry according to some embodiments.

FIG. 3 is a block diagram illustrating example power management circuitry according to some embodiments. Power management circuitry 302 is a component of one or more integrated circuit dies 100 and is configured to detect or predict an excursion from one or more operating parameters of a power supply. Power management circuitry 302 may be one example of power regulator circuitry 240 or power control 110. Based on detecting or predicting the excursion, power management circuitry 302 is configured to generate data rate limit control signal 126 to implement proportional data rate limiting functionality. In response to determining that proportional data rate limiting is inadequate to mitigate or prevent the excursion, power management circuitry 302 is further configured to generate non-proportional control signal 356 to implement a fallback control procedure.

Power management circuitry 302 includes accumulator circuitry 310, peak current violation circuitry 320, and power regulator circuitry 240. Additionally, power management circuitry 302 may be a component in a power management system (not depicted) associated with one or more integrated circuit dies 100 and is configured to manage one or more power supplies that are configured to provide power to one or more integrated circuit dies 100. This power management system includes one or more power delivery capacitors 330.

During operation of power management circuitry 302, accumulator circuitry 310 is configured to receive multiple current estimates 214A-214N, such as may be generated by digital power estimators 206A-206N. Accumulator circuitry 310 is further configured to aggregate two or more of current estimates 214A-214N to generate aggregated current draw estimate 222. Aggregated current draw estimate 222 may indicate an overall power usage of one or more integrated circuit dies 100 based on dynamic current usage of client circuitry 150A-150N.

Note that, in some embodiments, current draw estimates 214A-214N may indicate or include a switched capacitance associated with given client circuitry 150A-150N as determined by digital power estimators 206A-206N. For example, for given client circuitry, such as client circuitry 150A, a corresponding digital power estimator 206A may be configured to estimate a dynamic switched capacitance associated with given client circuitry 150A based on a power event occurring at given client circuitry 150A (e.g., referred to as e (i)) multiplied by a weight associated with the power event (e.g., referred to as w (i)). The weight may be a value stored in a memory of digital power estimator 206A. For example, a given digital power estimator 206A-206N may determine the dynamic switched capacitance by applying the following:

$$C_{dynamic} = \sum_i e(i)w(i).$$

The dynamic switched capacitance, $C_{dynamic}$, equals, for all power events e (i) occurring at given client circuitry 150A corresponding to digital power estimator 206A, the sum of the product of a weight associated with each such power event w (i) and a magnitude of the power event e (i). The power event e (i) may include or correspond to a quantity of electrical current used by given client circuitry 150A.

Peak current violation circuitry 320 is configured to receive aggregated current draw estimate 222 and power management data 344. Power management data 344 may be generated by the power management system and may include information about the power supply. For example, power management data 344 may indicate operating parameters of the power supply, such as a peak current capability of the power supply. The peak current capability of the power supply may correspond to electrical current threshold 138. Additionally, power management data 344 may indicate one or more power parameters associated with one or more of client circuitry 150A-150N, such as a leakage current associated with one or more of client circuitry 150A-150N. Further, power management data 344 may indicate operating parameters associated with one or more of client circuitry 150A-150N, such as an indicating of a type of data traffic (e.g., RT, ISOC, bulk) that one or more of client circuitry 150A-150N principally processes.

Based on aggregated current draw estimate 222 and power management data 344, peak current violation circuitry 320 may be configured to detect a violation of the peak current capability of the power supply. For example, peak current violation circuitry 320 may detect the violation by determining whether the following inequality has been satisfied:

$$I_{estimated} + I_{leakage} + I_{dynamic} + V \sum_{Digital\ power\ estimators} C_{dynamic} > I_{peak\ current\ capability}$$

where $I_{estimated}$ is the estimated current consumed by one or more integrated circuit dies 100, $I_{leakage}$ is the leakage current associated with one or more of client circuitry 150A-150N, $C_{dynamic}$ is a switched capacitance determined by one or more of digital power estimators 206A-206N, and $I_{peak\ current\ capability}$ is the peak current capability of the power supply.

In response to detection of a violation of the peak current capability of the power supply, peak current violation circuitry 320 is further configured to generate peak current violation indication 348 and to provide the indication 348 to power regulator circuitry 240. In response to receipt of peak current violation indication 348, power regulator circuitry 240 is configured to determine a magnitude of the peak current violation. For example, to determine the magnitude of the peak current violation, power regulatory circuitry 240 may apply the following:

$$\int_{t_0}^{t_1} (I_{est}(t) - I_{peak\ current\ capability})dt \le 0 \qquad (1)$$

$$\int_{t_0}^{t_1} (I_{est}(t) - I_{peak\ current\ capability})dt \ge Q_{budget} \qquad (2)$$

In particular, power regulatory circuitry 240 may be configured to integrate the estimated current consumed by one or more integrated circuit dies 100, $I_{est}(t)$, over a timeframe starting at a time $t_0$, at which power regulatory circuitry 240 receives peak current violation indication 348, and a configurable time $t_1$, comparing the result with $I_{peak\ current\ capability}$, the peak current capability of the power supply, via subtraction. As indicated in equation 1, in response to a difference between the estimated current consumed by one or more integrated circuit dies 100 over the timeframe and the peak current capability of the power supply being less than or equal to zero, power regulator circuitry 240 may not initiate any further functionality, because the condition of equation 1 indicates that the excursion has ceased. In contrast, in response to determining that difference between the estimated current consumed by one or more integrated circuit dies 100 over the timeframe and the peak current capability of the power supply is greater than a charge budget $Q_{budget}$ (the situation indicated by equation 2), power regulatory circuitry 240 may generate data rate limit control signal 126 to initiate proportional limitation of a data rate of communication on fabric circuitry.

In some embodiments, the charge budget is the same as peak current capability of the power supply. In other embodiments, the system may provide a power buffer that may be utilized prior to initiating data rate limiting. For example, in response to receipt of peak current violation indication 348, power regulator circuitry 240 may facilitate access, by one or more of client circuitry 150A-150N, to power output 360 generated by one or more power delivery capacitors 330 of the power supply. In these embodiments, the charge budget may correspond to the sum of power output 360 and peak current capability of the power supply. Note that various guard bands may be implemented such that the charge budget is lesser than the actual peak current capability (or peak current capability plus the capability of power delivery capacitor(s) 330).

Power regulator circuitry 240 may be configured to monitor the estimated current consumed by one or more integrated circuit dies 100 after initiation of the proportional limitation of the data rate of communication on the fabric circuitry. In response to detecting that the limitation of the data rate of communications has not satisfied one or more criteria for addressing the violation of the peak current capability of the power supply, power regulator circuitry 240 may initiate a fallback control procedure by outputting non-proportional control signal 356. In response to receipt of non-proportional control signal 356, the limitation of the data rate of communications on fabric circuitry 140 may continue and a clock frequency of an input clock may be downshifted (e.g., reduced) for at least a portion of fabric circuitry 140. Example clock downshift techniques are described in U.S. Pat. No. 10,581,440, entitled "Detecting Power Supply Noise Events and Initiating Corrective Action," filed on Jan. 30, 2017. Further details regarding this fallback control procedure are described with reference to FIG. 6.

Initiation, by power regulatory circuitry 240, of the fallback control procedure may advantageously reduce or avoid equipment damage, computational errors, or both that might be associated with unmitigated excursions. Additionally, because the fallback control procedure may further impinge upon performance of one or more of client circuitry 150A-150N, implementing the fallback control procedure only after a determination that the proportional data rate limiting procedure is inadequate to address the excursion may reduce performance impacts.

Example of Clock Frequency Control for Client Circuitry

Figure 4B:
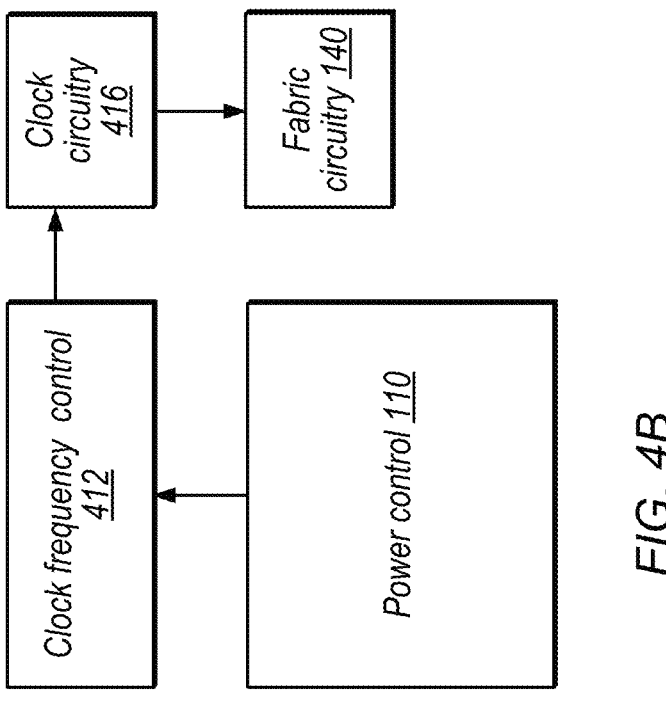
FIG. 4B is a block diagram illustrating example clock frequency control for fabric circuitry, according to some embodiments.
Figure 4A:
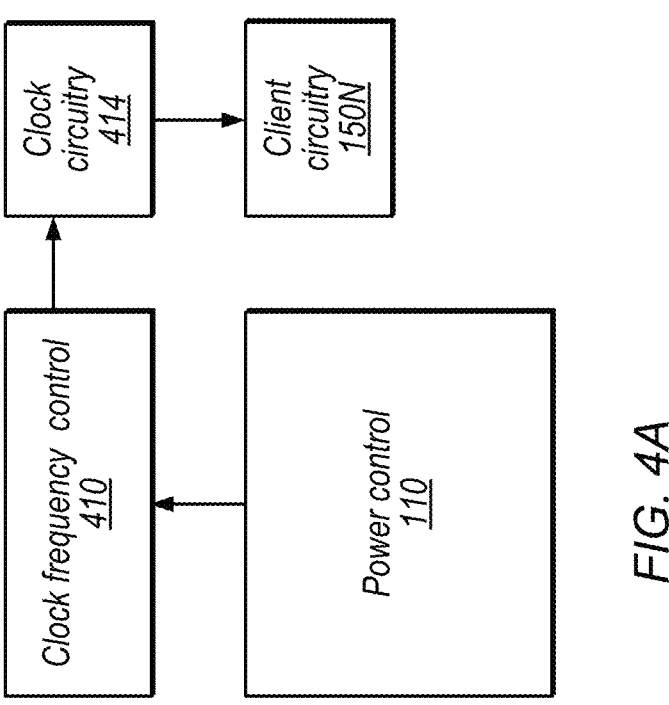
FIG. 4A is a block diagram illustrating example clock frequency control for client circuitry, according to some embodiments.

FIG. 4A is a block diagram illustrating example clock frequency control for client circuitry, according to some embodiments. As part of the proportional response to an electrical current threshold violation, power control 110 may downshift clock frequency for selected client circuitry 150A-150N, proportionally to the magnitude of the electrical current threshold violation. For example, power control 110 may downshift the frequency of a client circuit 150 that has limited (or no) real-time (RT) data traffic on fabric circuitry 140.

In the illustrated example, the system includes power control 110, clock frequency control 410, clock circuitry 414, and client circuitry 150N. In response to detection of a violation of an electrical current threshold indicating an excursion, power control 110 may provide a signal to clock frequency control 410. In response to receipt of the signal, clock frequency control 410 may provide a control signal to clock circuitry 414 associated with or corresponding to client circuitry 150N. Client circuitry 150N may principally process non-RT data traffic, such as bulk data traffic. In response to receipt of the signal, a clock frequency of clock circuitry 414 may be downshifted proportionally to a magnitude of the violation of the electrical current threshold. The downshift may be proportional in terms of frequency, duration, or both, to attributes of the violation.

This downshift for certain clients but not others may improve the speed at which a violation is mitigated, without further negatively impacting performance of clients whose clock frequencies are not downshifted.

Example of Clock Frequency Control for Fabric Circuitry

FIG. 4B is a block diagram illustrating example clock frequency control for fabric circuitry, according to some embodiments. In a fallback control procedure, in addition to extending a duration of the limitation of the data rate, power control 110 may downshift a clock frequency of an input clock for at least a portion of fabric circuitry 140.

In the illustrated example, the system includes power control 110, clock frequency control 412, clock circuitry

416, and fabric circuitry 140. In response to determining that proportional limitation of a data rate of communications on fabric circuitry 140 has been inadequate to sufficiently mitigate the excursion, power control 110 may send a signal to clock frequency control 412. In response to the signal, clock frequency control 412 may control clock circuitry 416 associated with fabric circuitry 140 by downshifting a clock frequency of clock circuitry 416 associated with fabric circuitry 140. By downshifting the clock frequency, electrical current consumed by the system is further curtailed, thereby mitigating the excursion.

Figure 5:
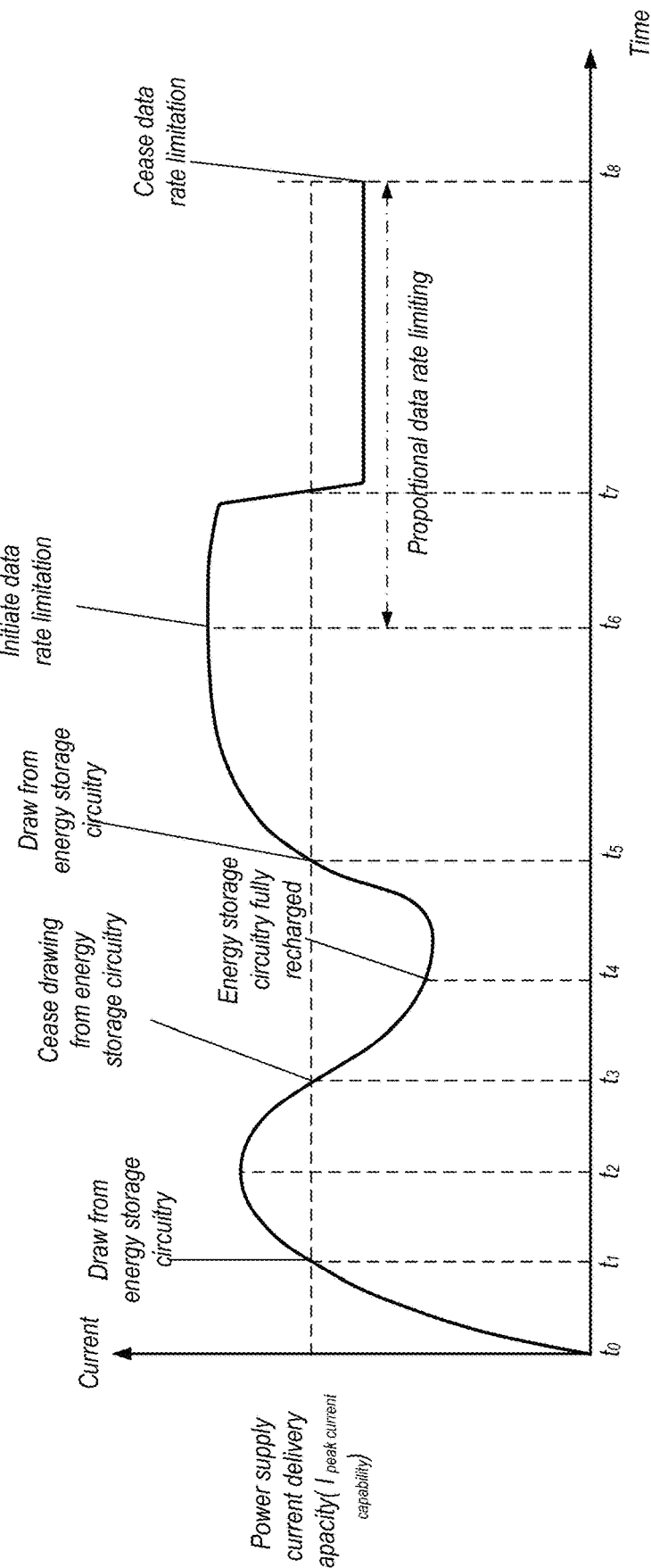
FIG. 5 is a diagram illustrating example current draw over time and example timing of proportional data rate limiting, according to some embodiments.

Example of Proportional Data Rate Limiting as a Function of Current and Time FIG. 5 is a diagram illustrating example current draw over time and example timing of proportional data rate limiting, according to some embodiments. As shown in FIG. 5, a power supply of one or more integrated circuit dies is configured to deliver a peak current, $I_{peak\ current\ capability}$. However, at particular time intervals, such as between $t_1$ and $t_3$ and between $t_5$ and $t_7$, one or more of client circuitry 150A-150N may consume a quantity of electrical current that exceeds a current supplying capability of the power supply.

Between $t_0$ and $t_1$, power control 110 may predict a possible excursion based, for example, on detecting a rapid increase in electrical current usage as shown between $t_0$ and $t_1$. Accordingly, power control 110 may configure one or more of client circuitry 150A-150N to draw electrical current from energy storage circuitry, such as power delivery capacitor(s) 330. Thus, energy storage circuitry temporarily may supplement the peak current delivery capability of the power supply.

In the example of FIG. 5, the event causing the power excursion dissipates at $t_3$, thereby enabling the energy storage circuitry to recharge. For example, at $t_4$, the energy storage circuitry is fully recharged. Based on detecting decreasing current usage between $t_2$ and $t_4$, power control 110 may be configured to perform no further action. However, between $t_4$ and $t_5$, power control 110 may detect an increase in current usage. Based on this detected increase in current usage, at t5, power control may configure one or more of client circuitry 150A-150N to draw electrical current from the energy storage circuitry. Based on failing to detect a decrease in electrical current usage between $t_5$ and $t_6$, at to power control 110 is configured to initiate proportional data rate limiting, which lasts from $t_6$ to $t_8$. Proportional data rate limiting is configured to reduce electrical current usage by one or more of client circuitry 150A-150N, thereby mitigating the excursion at $t_7$. Unlike proportional data rate limiting, which occurs over the relatively short timeframe between $t_6$ and $t_8$, non-proportional data rate limiting occurs over a longer timeframe, ending significantly after $t_8$. In comparison to the longer timeframe during which non-proportional data rate limiting occurs, proportional data rate limiting enables client circuitry 150A-150N to recover from data rate limiting, thereby reducing an impact on performance of the one or more integrated circuit dies 100 relative to non-proportional data rate limiting.

Example of a Non-Proportional Power Excursion Mitigation Technique

FIG. 6 is a flow diagram illustrating example fallback to non-proportional mitigation techniques, according to some embodiments. As depicted in FIG. 6, in response to determining that proportional data rate limiting is inadequate to mitigate an excursion, power control, such as power control 110, is configured to implement non-proportional data rate limiting as a fallback or safety mechanism.

At 610, power control 110 proportionally limits a data rate of communication on fabric circuitry, such as fabric circuitry 140. At 620, the power control determines whether there has been a satisfactory mitigation of the violation. For example, power control 110 may determine that there has been satisfactory mitigation of the violation by detecting a decrease in electrical current usage over a period of time. In response to detection of satisfactory mitigation of the violation, at 630, the power control ceases limitation of the data rate of communications on the fabric circuitry.

Conversely, in response to determining that proportional limitation of the data rate of communications on the fabric circuitry was inadequate to mitigate the violation, at 640, the power control downshifts a clock frequency of an input clock for at least a portion of the fabric circuitry. For example, in response to determining that non-proportional data rate limiting was inadequate, power regulator circuitry 240 may generate non-proportional control signal 356 to downshift the clock frequency of the input clock of fabric circuitry 140, such as described with reference to FIG. 4B.

At 650 the power control continues the limitation of the data rate of communications on the fabric circuitry for a predetermined time interval. For example, in response to determining that non-proportional data rate limiting was inadequate, power regulator circuitry 240 may generate non-proportional control signal 356 to indicate a continuation of a duration of the limitation of the data rate of communications on fabric circuitry 140. While FIG. 6 depicts that both 640 and 650 are performed, in some embodiments, 640 is performed while 650 is not performed, while in other embodiments 650 is performed while 640 is not performed. Additionally, while FIG. 6 depicts that 640 is performed prior to 650, in other embodiments 650 is performed prior to 640 or concurrently with performance of 640.

Example Toggle Detector Circuitry

Figure 7:
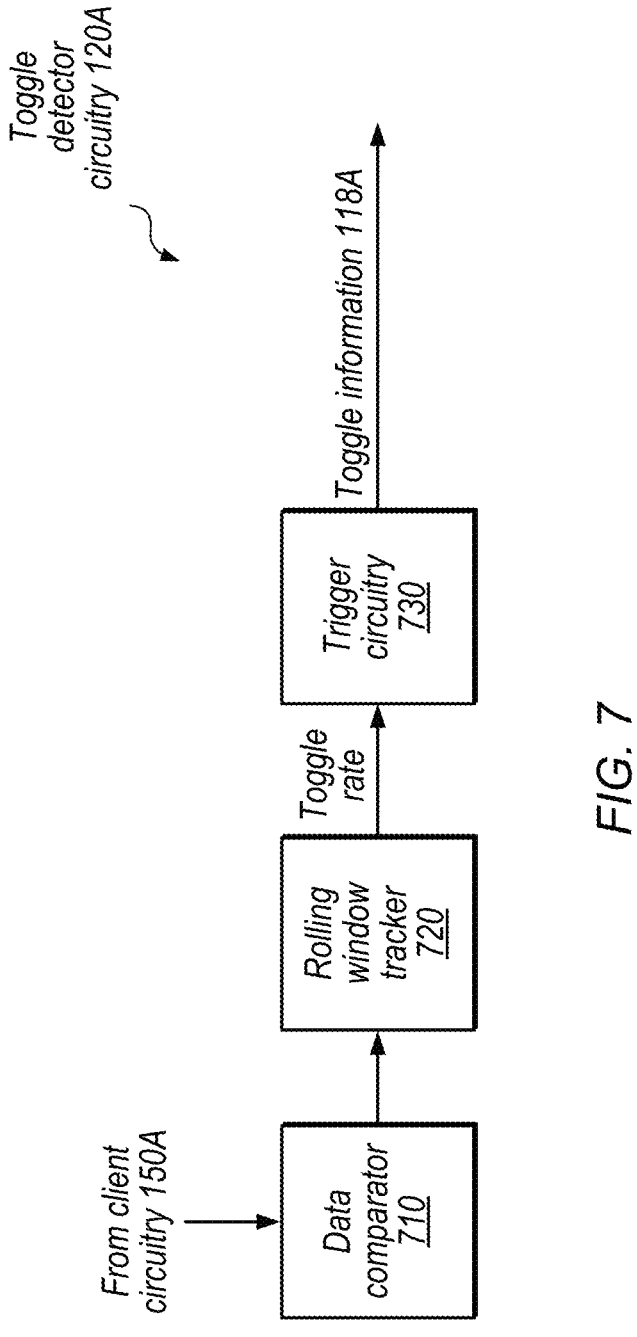
FIG. 7 is a block diagram illustrating example toggle detector circuitry, according to some embodiments.

FIG. 7 is a block diagram illustrating example toggle detector circuitry 120, according to some embodiments. In the illustrated embodiment, toggle detector circuitry 120 includes a data comparator 710, a rolling window tracker 720, and trigger circuitry 730. Toggle detector circuitry 120 receives input from client circuitry 150 via interface circuitry 106 and outputs toggle rate 118.

Data comparator circuitry 710, in some embodiments, is configured to compare data from client circuitry 150 (or compare data from client circuitry 150 from different clock cycles). Data comparator 710 is configured to output information indicating a per-cycle number of toggles, in some embodiments. A more detailed example implementation of data comparator 710 is discussed below with reference to FIG. 8.

Rolling window tracker circuitry 720, in some embodiments, is configured to receive the output of data comparator 710 and generate a toggle rate for trigger circuitry 730. For example, rolling window tracker 720 may aggregate the toggle rate over multiple cycles.

In some embodiments, toggle detector circuitry 120 includes multiple rolling window trackers that operate on the output of the same data comparator 710. The toggle rate thus may be measured over multiple rolling windows of different lengths. Multiple rolling window trackers 720 of different lengths may provide a more detailed profile of toggling activity which may advantageously enable more precise data rate limiting, according to some embodiments.

Trigger circuitry 730, in some embodiments, is configured to receive the toggle rate and outputs toggle information 118 (e.g., a toggle-based trigger) for power control 110. Trigger circuitry 730 may assert a trigger based on detection of various threshold scenarios. As one example, the toggle rate meeting a threshold over the rolling window may be a first threshold scenario and may cause trigger circuitry 730 to assert a trigger. As other examples, trigger circuitry 730 may assert triggers based on logical combinations of multiple different thresholds being met, based on arithmetic operations performed on toggle rate values from different rolling window trackers and comparison of an output to one or more thresholds provides an example of trigger circuitry that operates based on outputs from multiple rolling window trackers. Note that thresholds are configurable (via e.g., control registers) in some embodiments, which may allow customization for different workloads, different versions of a processor architecture, updates based on performance information, etc.

In some embodiments, trigger circuitry 730 is omitted. In these embodiments, rolling window tracker 720 may directly output the toggle rate to power control 110. Generally, control circuitry that generates or processes toggle information may be included in toggle detector circuitry 120, power control 110, other circuitry, or some combination thereof. In embodiments with such control circuitry in multiple different blocks, the amounts of computation and decision circuitry in different blocks may vary.

In some embodiments, control circuitry is configured to save toggle information (e.g., in a register, in a pre-determined memory space, etc.) such that the toggle information is available for debug or available to software (e.g., an operating system, a kernel, etc.). This may allow use of the toggle information for telemetry, for example.

Detailed Example of Toggle Detector Circuitry

Figure 8:
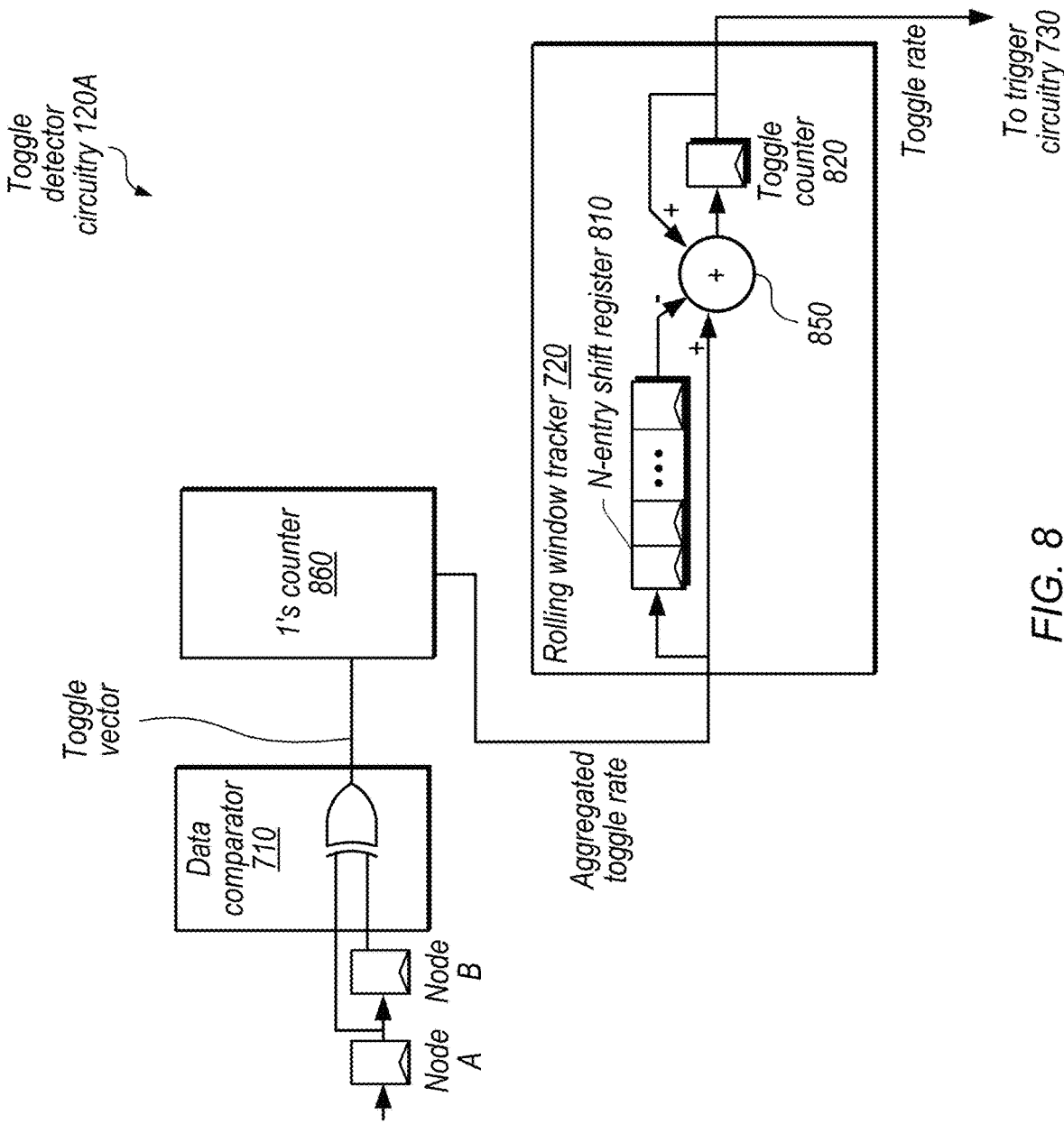
FIG. 8 is a block diagram illustrating a more detailed example toggle detector circuitry, according to some embodiments.

FIG. 8 is a block diagram illustrating a more detailed example toggle detector circuitry 120, according to some embodiments. In particular, FIG. 8 shows example implementations of data comparator 710 and rolling window tracker 720. These implementations are not intended to limit the scope of the present disclosure, however, and other circuit implementations of these elements are contemplated.

Data comparator 710, in the illustrated embodiment, includes exclusive-or (XOR) circuitry configured to compare data values at different circuit nodes A and B in a given cycle. In some embodiments, data comparator 710 is configured to XOR all or a portion of the bits at node A with corresponding bits at node B and output the results of XOR operations as a toggle vector that indicates the number of toggles that occurred in a given cycle. In these embodiments, each bit in the toggle vector indicates whether a bit toggle occurred, and the sum of the set bits in the toggle vector corresponds to the overall number of toggles for the compared bits of the data bus, in a given cycle.

1's counter circuitry 860, in some embodiments, is configured to count the number of set bits in the toggle vector and provide the toggle count to rolling window tracker 720. 1's counter circuitry 860 may be implemented using a compression tree, for example. In some embodiments, 1's counter circuitry 860 is configured to quantize the toggle count. For example, a 2-bit signal may indicate the toggle rate at the granularity of $\frac{1}{4}^{th}$ of the data bus, a 3-bit signal at $\frac{1}{8}^{th}$ of the data bus, and so on. This quantization may allow for a sufficient characterization of the toggle rate in certain architectures or scenarios with a reduced number of toggle count bits. In other embodiments, various toggle control circuitry operates on precise toggle rate information that exactly identifies the number of bits toggled in a given cycle, without quantization. 1's counter 860, in some embodiments, may be configured to aggregate the toggle count over a certain number of cycles (which may be smaller than the window tracked by rolling window tracker 720) before reporting the toggle rate to rolling window tracker 720.

Rolling window tracker 720, in the illustrated embodiment, is configured to receive the aggregated toggle rate from 1's counter 860 and output a toggle rate for the current window. In the illustrated example, rolling window tracker 720 includes an N-entry shift register 810, summation circuitry 850, and a toggle counter 820.

N-entry shift register 810, in the illustrated embodiment, is configured to store toggle count information received from data comparator 710 for different times intervals. As one example, each entry may store toggle rate for a given clock cycle. As shown, register 810 is updated with every clock cycle: its leftmost entry receives the number of toggles for the latest measured clock cycle, while its rightmost entry is the oldest entry and is shifted out each cycle.

In some embodiments, the length N of register 810 is programmable. For example, the register may physically implement a certain number of entries but a configuration register may control the number of entries being used by routing the output of the oldest entry (at the programmed size) to summation circuitry 850.

Summation circuitry 850, in the illustrated embodiment, outputs the latest sum of toggle counts over the past N cycles. As shown, at every clock cycle, 1's counter 860 outputs a cycle toggle count that becomes the first/leftmost N-entry shift register 810 and is also input into summation circuitry 850. Toggle counter 820 feeds back the previous toggle sum over N cycles to maintain the toggle sum value. The Nth/rightmost entry of register 810 is removed from register 810 and subtracted from the sum at toggle counter 820.

Numerically, the output of summation circuitry 850 equals the previous toggle count over N cycles (from toggle counter 820) plus the latest toggle count (from 1's counter 860) minus the oldest toggle rate (from the oldest entry in N-entry shift register 810). The output of toggle counter 820, in the illustrated embodiment, thus corresponds to the sum of all entries of shift register 810.

Toggle counter 820, in the illustrated embodiment, is configured to feed back the toggle sum at previous clock cycle into summation circuitry 850 and store the updated/current toggle sum received from summation circuitry 850. Rolling window tracker 720, in the illustrated embodiment, is configured to output the toggle rate to trigger circuitry 730 (in other embodiments, rolling window tracker 720 may provide this information directly to data rate limiter control 130). In some embodiments, rolling window tracker 720 may determine an average toggle rate (e.g., per cycle or over multiple cycles). For example, rolling window tracker 720 may divide or right-shift the output of toggle counter 820.

Electrical Transmission of Current Draw Estimates Used Gated Clock Circuitry

Figure 9:
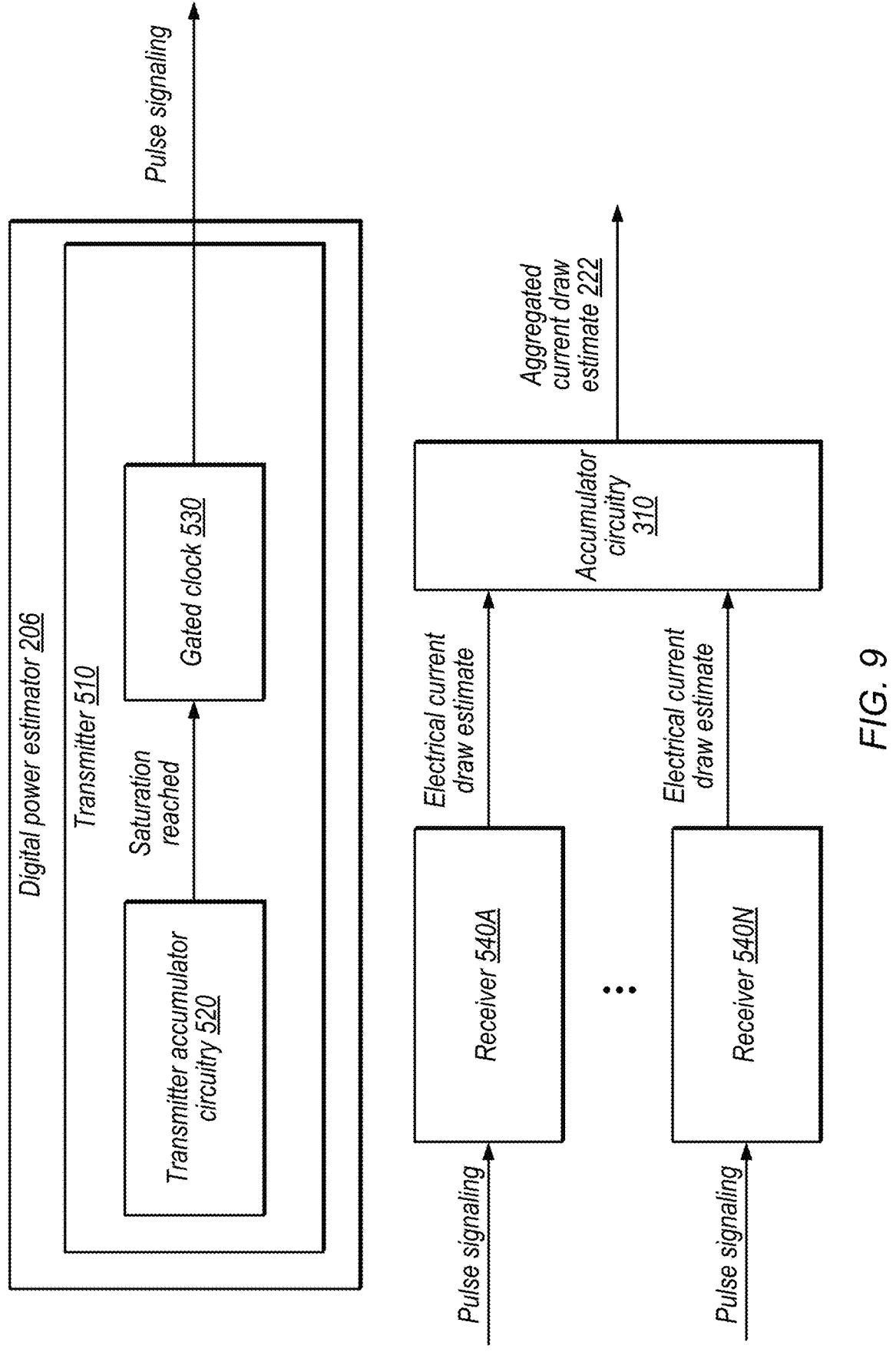
FIG. 9 is a block diagram illustrating example transmitter circuitry and receiver circuitry configurable to communicate an electrical current draw estimate using pulse signaling, according to some embodiments.

FIG. 9 is a block diagram illustrating example transmitter circuitry and receiver circuitry configurable to communicate an electrical current draw estimate using pulse signaling, according to some embodiments. A given digital power estimator may be configured to convert data collected from interface circuitry and associated with given client circuitry to pulse signals indicative of a magnitude of the electrical current drawn by the given client circuitry. A given receiver may receive the pulse signaling, converting the pulse signaling into an electrical current draw estimate associated with the given client circuitry. Accumulator circuitry may combine electrical current draw estimates provided by one or more receivers.

In the illustrated example, the system includes digital power estimator 206, receivers 540A-540N, and accumulator circuitry 310. Digital power estimator 206 in turn includes transmitter 510 which itself includes transmitter accumulator circuitry 520 and gated clock circuitry 530. In some embodiments, multiple distributed receivers 540 are configured to receive clock signals from different corresponding digital power estimators 206.

Transmitter accumulator circuitry 520, in some embodiments, is configured to accumulate data indicative of an electrical current usage associated with an instance of client circuitry. For example, transmitter accumulator circuitry 520 may accumulate dynamic switched capacitance values up to a configurable threshold value or saturation value. Additionally, in some embodiments, transmitter accumulator circuitry 520 is configured to provide a "saturation reached" signal to gated clock 530. The threshold/saturation value may be configurable and may dictate the granularity of reported current draw estimates.

Gated clock 530, in some embodiments, is configured to generate a pulse signal in response to receipt of the signal indicating that saturation has been reached. As shown, the pulse signal is transmitted receiver 540.

A given receiver 540, in some embodiments, is configured to generate an electrical current draw estimate based on the clock signal. For example, receiver 540 may be configured to count a quantity of received clock signals over a time period and generate a value that indicates the count (e.g., a gray code). The receiver 540 then reports this value as an electrical current draw estimate to accumulator circuitry 310.

Accumulator circuitry 310, in some embodiments, is configured to accumulate (e.g., perform a summation operation) on the electrical current draw estimates provided by receivers 540 to generate aggregated current draw estimate 222. Note that accumulator circuitry 310 may accumulate current draw estimates using multiple hierarchically-arranged levels of accumulators (not explicitly shown).

Example Method

FIG. 10 is a flow diagram illustrating an example method 1000 to implement proportional limitation on a data rate of communication on fabric circuitry, according to some embodiments. Method 1000 may be used in conjunction with any of the computer systems, devices, elements, or components disclosed herein, among other devices. In various embodiments, some of the method elements shown may be performed concurrently, in a different order than shown, or may be omitted. Additional method elements may also be performed if desired.

At 1010, in the illustrated example, a computing system generates an estimate of electrical current use by a given client circuit of multiple client circuits configured to communicate via fabric circuitry, based on a toggle rate measured at an interface between the given client circuit and the fabric circuitry and one or more communications events associated with activity of the given client circuit on the fabric circuitry. Note that a given interface circuit may couple a given client circuit to the fabric circuitry and toggle rate detector circuitry may be distributed at different interface circuits and may measure toggle rate between a given interface circuit and the fabric circuitry.

For example, power control 110 may be configured to generate, for a given client circuit 150 of multiple client circuits 150 configured to communicate via fabric circuitry 140, an estimate of electrical current use by given client circuit 150. The estimate of electrical current use may be based on toggle information 118 measured at interface 106 between given client circuit 150 and fabric circuitry 140 and on communication events 122 associated with activity of given client circuit 150 on fabric circuitry 140. Given interface circuit 106 may be configured to couple given client circuit 150 to fabric circuitry 140. Additionally, toggle rate detector circuitry 120 may be distributed at different interface circuits 106 and may be configured to measure toggle rate 118 between a given interface circuit 106 and fabric circuitry 140.

At 1020, in the illustrated example, the system detects a violation of an electrical current threshold based on generated current estimates for multiple client circuits. For example, power control 110 may be configured to detect a violation of electrical current threshold 138 based on current draw estimates 134 for multiple client circuits 150.

At 1030, in the illustrated example, the system limits a data rate of communications on the fabric circuitry in proportion to an amount of the violation of the electrical current threshold. For example, power control 110 may be configured to limit a data rate of communications on fabric circuitry 140, proportionally to an amount of the violation of electrical current threshold 138 via data rate limit control signal 126 sent, by power control 110, to fabric circuitry 140.

In some embodiments, to limit the data rate of communications on the fabric circuitry, the power control circuitry is configured to limit the data rate for a first time period that is proportional to the amount of the violation of the electrical current threshold. For example, to limit the data rate of communications on fabric circuitry 140, power control 110 may be configured to limit the data rate for a first time period that is proportional to the amount of the violation of electrical current threshold 138.

In some embodiments, to limit the data rate of communications on the fabric circuitry, the power control circuitry is configured to limit the data rate for a first time period that is proportional to a time duration of the violation. For example, to limit the data rate of communications on fabric circuitry 140, power control 110 is configured to limit the data rate for a first time period that is proportional to a time duration of the violation of electrical current threshold 138.

In some embodiments, the one or more communications events include at least: memory access requests by the given client circuit and valid packets transmitted by the given client circuit. For example, communication events 122 include at least memory access requests by given client circuit 150 and valid packets transmitted by given client circuit 150.

In some embodiments, the power control circuitry is further configured to: estimate a bandwidth for the given client circuit based on the one or more communication events and generate the estimate of electrical current use by the given client circuit based on the bandwidth estimate. For example, power control 110 is further configured to: estimate a bandwidth of given client circuit 150 based on one or more communication events 122 and generate the estimate of electrical current use by given client circuit 150 based on the bandwidth estimate. The estimate of electrical current use by given client circuit 150 may correspond to a current draw estimate of current draw estimates 134. In some embodiments, power control 110 is distributed between power regulatory circuitry 240 and digital power estimator 206. In such embodiments, digital power estimator 206 is configured to generate current draw estimate 214, corresponding to the estimate of electrical current use, based on data that digital power estimator 206 receives from bandwidth estimator 202, toggle rate detector circuitry 102, or both. For example, toggle rate detector circuitry 120 is configured to measure a toggle rate (e.g., toggle information 118) of client circuitry 150 over interface circuitry 106 coupling client circuitry 150 to fabric circuitry 140. Toggle rate detector circuitry 120 may be configured to provide toggle information 118 to digital power estimator 206. Additionally, bandwidth estimator 202 is configured to determine a bandwidth of client circuitry 150 via communication events 122 over interface circuitry 106 and fabric circuitry 140. Bandwidth estimator 202 may provide a corresponding bandwidth estimate to digital power estimator 206. Digital power estimator 206 may be configured to generate current draw estimate 214 based on the bandwidth estimate, toggle information 118, or both.

In some embodiments, the fabric circuitry includes: switch circuitry that is shared by multiple virtual channels, different queue circuits for different virtual channels, and arbitration circuitry configured to arbitrate among different queue circuits. For example, fabric circuitry 140 may include switch circuitry shared by multiple virtual channels, different queues for different virtual channels, and arbitration circuitry configured to arbitrate among different queues.

In some embodiments, the limitation on the data rate provides different data rate limits for different virtual channels based on quality-of-service parameters corresponding to the different virtual channels. For example, the limitation on the data rate may provide different data rate limits 230-238 for different virtual channels (e.g., of fabric circuitry 140) based on quality-of-service parameters corresponding to the different virtual channels.

In some embodiments, the power control circuitry is further configured to aggregate the estimates of the electrical current use by the multiple client circuits to generate an aggregated electrical current usage estimate. For example, power regulator circuitry 240 may be configured to aggregate current draw estimates 214 of electrical use by multiple client circuits 150 to generate aggregated current draw estimate 222. Aggregated current draw estimate 222 indicates an overall quantity of power being used by one or more integrated circuit dies 100.

In some embodiments, the detection is based on a comparison of the electrical current threshold and the aggregated electrical current usage estimate. For example, power regulator circuitry 240 may be configured to detect a violation of electrical current threshold 138 by comparing, using comparator logic 226, electrical current threshold 138 and aggregated current draw estimate 222. In response to aggregated current draw estimate 222 meeting electrical current threshold 138 (e.g., exceeding electrical current threshold 138), power regulator circuitry 240 may detect a violation of electrical current threshold 138 constituting a power excursion event.

In some embodiments, the power control circuitry includes centralized control circuitry and distributed power estimate circuitry distributed at the different interfaces. For example, the centralized control circuitry may correspond to power regulator circuitry 240, and distributed power estimate circuitry may correspond to digital power estimator 206 distributed at interfaces 106.

In some embodiments, the distributed power estimate circuitry is configured to generate the estimates of electrical use by given client circuits. For example, digital power estimator 206 may be configured to generate current draw estimate 214 by given client circuit 150.

In some embodiments, the distributed power estimate circuitry is further configured to report the estimates to the centralized control circuitry. For example, digital power estimator 206 may be configured to report current draw estimate 214 to power regulator circuitry 240.

In some embodiments, the power control circuitry is further configured to downshift a clock frequency of an input clock for a proper subset of the multiple client circuits proportionally to the amount of the violation of the electrical current threshold. For example, power control 110 may be configured to downshift a clock frequency of an input clock for client circuitry 150 by signaling clock frequency control 410 to manipulate a frequency of clock circuitry 414.

In some embodiments, the power control circuitry is further configured to detect that the limitation of the data rate has not satisfied one or more criteria for addressing the violation of the electrical current threshold. For example, power control 110 may be configured to detect that the limitation of the data rate has not satisfied one or more criteria for addressing the violation of electrical current threshold 138. In some embodiments, in response to the detection, power control circuitry is further configured to perform a fallback current control procedure that includes to: continue the limitation of the data rate and downshift a clock frequency of an input clock for at least a portion of the fabric circuitry. For example, in response to detection of violation of electrical current threshold 138, power control 110 further may be configured to perform a fallback current control procedure that includes to: continue the limitation of the data rate (e.g., by providing data rate limit control signal 126 to fabric circuitry 140) and to downshift a clock frequency of an input clock for at least a portion of fabric circuitry 140.

In some embodiments, the power control circuitry is configured to delay the limitation of the data rate, subsequent to the detection, until a determination that one or more power delivery capacitors are not able to mitigate the violation. For example, power regulator circuitry 240 may be configured to delay limitation of the data rate until a determination that one or more power delivery capacitor are not able to mitigate the electrical current violation.

Example Device

Figure 11:
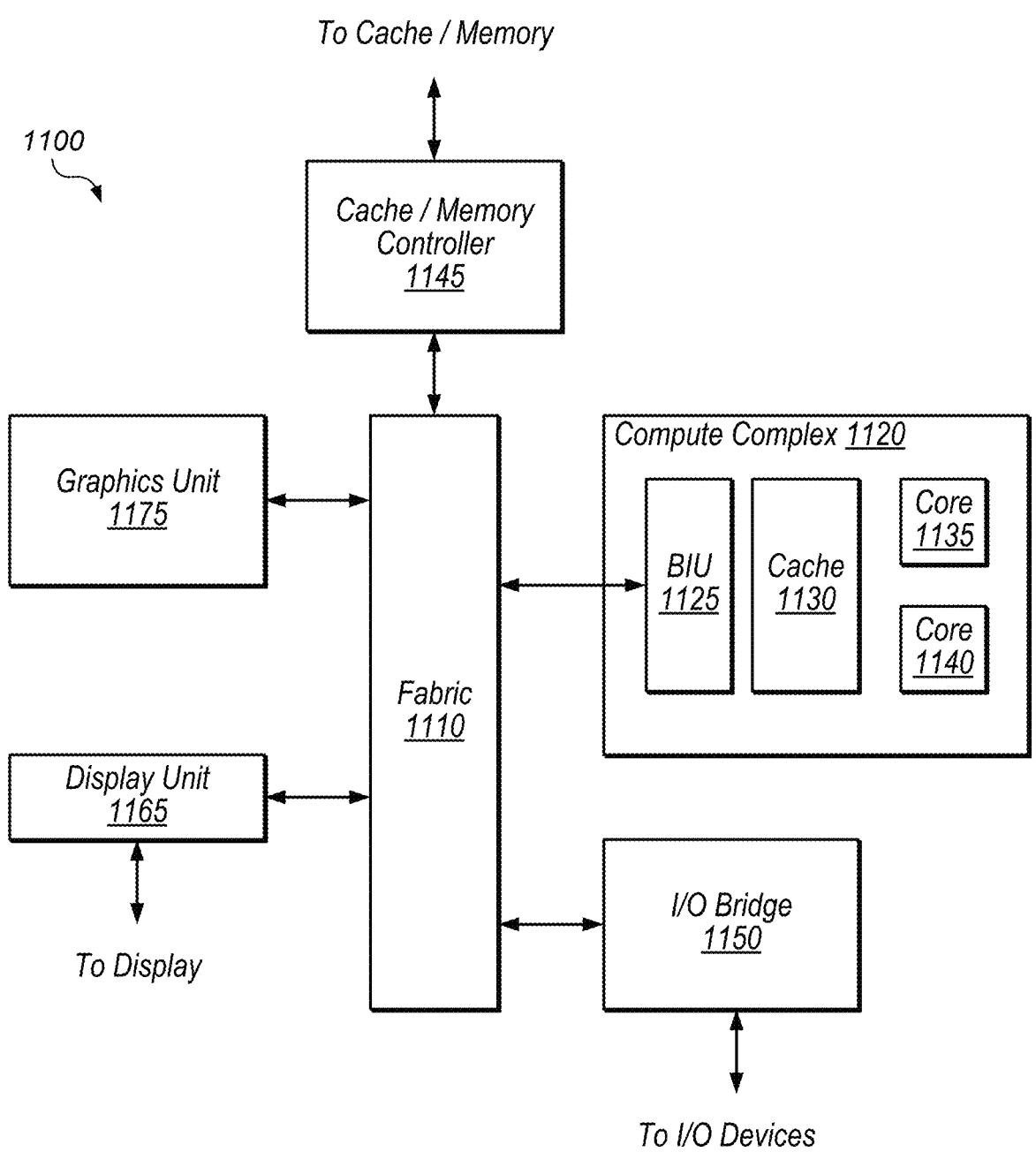
FIG. 11 is a block diagram illustrating an example computing device, according to some embodiments.

Referring now to FIG. 11, a block diagram illustrating an example embodiment of a device 1100 is shown. In some embodiments, elements of device 1100 may be included within a system on a chip. In some embodiments, device 1100 may be included in a mobile device, which may be battery-powered. Therefore, power consumption by device 1100 may be an important design consideration. In the illustrated embodiment, device 1100 includes fabric 1110, compute complex 1120, input/output (I/O) bridge 1150, cache/memory controller 1145, graphics unit 1175, and display unit 1165. In some embodiments, device 1100 may include other components (not shown) in addition to or in place of the illustrated components, such as video processor encoders and decoders, image processing or recognition elements, computer vision elements, etc.

Fabric 1110 may include various interconnects, buses, MUX's, controllers, etc., and may be configured to facilitate communication between various elements of device 1100. In some embodiments, portions of fabric 1110 may be configured to implement various different communication protocols. In other embodiments, fabric 1110 may implement a single communication protocol and elements coupled to fabric 1110 may convert from the single communication protocol to other communication protocols internally.

In some embodiments, disclosed techniques may advantageously allow power management circuitry to reduce or avoid negative impacts of power events by reducing the clock frequency of fabric 1110 while using rate limiting of other traffic to reduce impacts of the frequency reduction on high-priority traffic.

In the illustrated embodiment, compute complex 1120 includes bus interface unit (BIU) 1125, cache 1130, and cores 1135 and 1140. In various embodiments, compute complex 1120 may include various numbers of processors, processor cores and caches. For example, compute complex 1120 may include 1, 2, or 4 processor cores, or any other suitable number. In one embodiment, cache 1130 is a set associative L2 cache. In some embodiments, cores 1135 and 1140 may include internal instruction and data caches. In some embodiments, a coherency unit (not shown) in fabric 1110, cache 1130, or elsewhere in device 1100 may be configured to maintain coherency between various caches of device 1100. BIU 1125 may be configured to manage communication between compute complex 1120 and other elements of device 1100. Processor cores such as cores 1135 and 1140 may be configured to execute instructions of a particular instruction set architecture (ISA) which may include operating system instructions and user application instructions. These instructions may be stored in computer readable medium such as a memory coupled to memory controller 1145 discussed below.

As used herein, the term "coupled to" may indicate one or more connections between elements, and a coupling may include intervening elements. For example, in FIG. 11, graphics unit 1175 may be described as "coupled to" a memory through fabric 1110 and cache/memory controller 1145. In contrast, in the illustrated embodiment of FIG. 11, graphics unit 1175 is "directly coupled" to fabric 1110 because there are no intervening elements.

Cache/memory controller 1145 may be configured to manage transfer of data between fabric 1110 and one or more caches and memories. For example, cache/memory controller 1145 may be coupled to an L3 cache, which may in turn be coupled to a system memory. In other embodiments, cache/memory controller 1145 may be directly coupled to a memory. In some embodiments, cache/memory controller 1145 may include one or more internal caches. Memory coupled to controller 1145 may be any type of volatile memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR4, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit in a chip-on-chip configuration, a package-on-package configuration, or a multi-chip module configuration. Memory coupled to controller 1145 may be any type of non-volatile memory such as NAND flash memory, NOR flash memory, nano RAM (NRAM), magneto-resistive RAM (MRAM), phase change RAM (PRAM), Racetrack memory, Memristor memory, etc. As noted above, this memory may store program instructions executable by compute complex 1120 to cause the computing device to perform functionality described herein.

Graphics unit 1175 may include one or more processors, e.g., one or more graphics processing units (GPU's). Graphics unit 1075 may receive graphics-oriented instructions, such as OPENGL®, Metal, or DIRECT3D® instructions, for example. Graphics unit 1175 may execute specialized GPU instructions or perform other operations based on the received graphics-oriented instructions. Graphics unit 1175 may generally be configured to process large blocks of data in parallel and may build images in a frame buffer for output to a display, which may be included in the device or may be a separate device. Graphics unit 1175 may include transform, lighting, triangle, and rendering engines in one or more graphics processing pipelines. Graphics unit 1175 may output pixel information for display images. Graphics unit 1175, in various embodiments, may include programmable shader circuitry which may include highly parallel execution cores configured to execute graphics programs, which may include pixel tasks, vertex tasks, and compute tasks (which may or may not be graphics-related).

Display unit 1165 may be configured to read data from a frame buffer and provide a stream of pixel values for display. Display unit 1165 may be configured as a display pipeline in some embodiments. Additionally, display unit 1165 may be configured to blend multiple frames to produce an output frame. Further, display unit 1165 may include one or more interfaces (e.g., MIPI® or embedded display port (eDP)) for coupling to a user display (e.g., a touchscreen or an external display).

I/O bridge 1150 may include various elements configured to implement: universal serial bus (USB) communications, security, audio, and low-power always-on functionality, for example. I/O bridge 1150 may also include interfaces such as pulse-width modulation (PWM), general-purpose input/output (GPIO), serial peripheral interface (SPI), and inter-integrated circuit (I2C), for example. Various types of peripherals and devices may be coupled to device 1000 via I/O bridge 1150.

In some embodiments, device 1100 includes network interface circuitry (not explicitly shown), which may be connected to fabric 1110 or I/O bridge 1150. The network interface circuitry may be configured to communicate via various networks, which may be wired, wireless, or both. For example, the network interface circuitry may be configured to communicate via a wired local area network, a wireless local area network (e.g., via Wi-Fi™), or a wide area network (e.g., the Internet or a virtual private network). In some embodiments, the network interface circuitry is configured to communicate via one or more cellular networks that use one or more radio access technologies. In some embodiments, the network interface circuitry is configured to communicate using device-to-device communications (e.g., Bluetooth® or Wi-Fi™ Direct), etc. In various embodiments, the network interface circuitry may provide device 1100 with connectivity to various types of other devices and networks.

Example Applications

Figure 12:
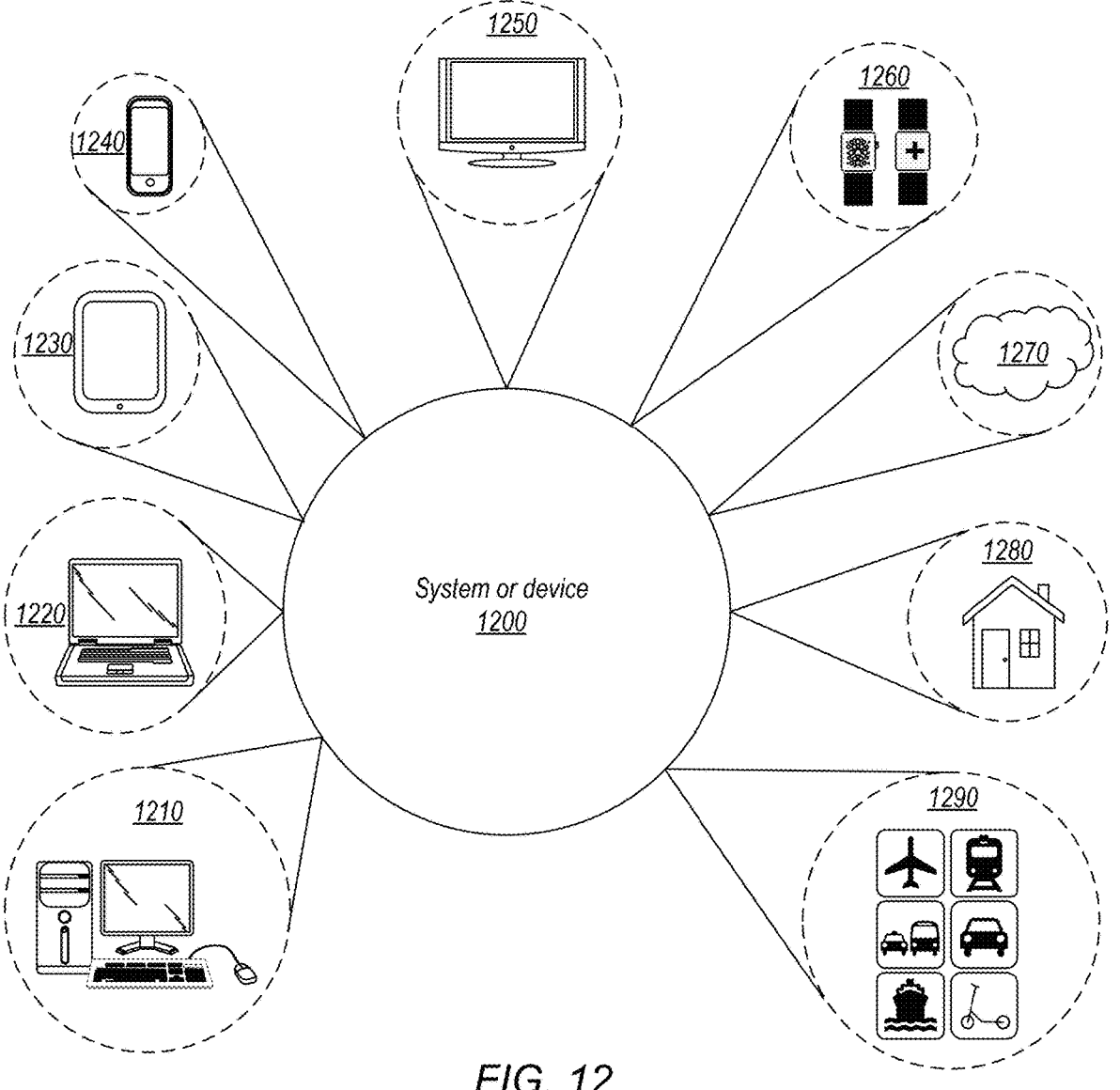
FIG. 12 is a diagram illustrating example applications of disclosed systems and devices, according to some embodiments.

Turning now to FIG. 12, various types of systems that may include any of the circuits, devices, or system discussed above. System or device 1200, which may incorporate or otherwise utilize one or more of the techniques described herein, may be utilized in a wide range of areas. For example, system or device 1200 may be utilized as part of the hardware of systems such as a desktop computer 1210, laptop computer 1220, tablet computer 1230, cellular or mobile phone 1240, or television 1250 (or set-top box coupled to a television).

Similarly, disclosed elements may be utilized in a wearable device 1260, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 1200 may also be used in various other contexts. For example, system or device 1200 may be utilized in the context of a server computer system, such as a dedicated server or on shared hardware that implements a cloud-based service 1270. Still further, system or device 1200 may be implemented in a wide range of specialized everyday devices, including devices 1280 commonly found in the home such as refrigerators, thermostats, security cameras, etc. The interconnection of such devices is often referred to as the "Internet of Things" (IoT). Elements may also be implemented in various modes of transportation. For example, system or device 1200 could be employed in the control systems, guidance systems, entertainment systems, etc. of various types of vehicles 1290.

The applications illustrated in FIG. 12 are merely exemplary and are not intended to limit the potential future applications of disclosed systems or devices. Other example applications include, without limitation: portable gaming devices, music players, data storage devices, unmanned aerial vehicles, etc.

Example Computer-Readable Medium

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that is recognized by a computing system configured to generate a simulation model of the hardware circuit, by a fabrication system configured to produce hardware (e.g., an integrated circuit) that includes the disclosed circuitry, etc. Claims to such a storage medium are intended to cover, for example, an entity that produces a circuit design, but does not itself perform complete operations such as: design simulation, design synthesis, circuit fabrication, etc.

Figure 13:
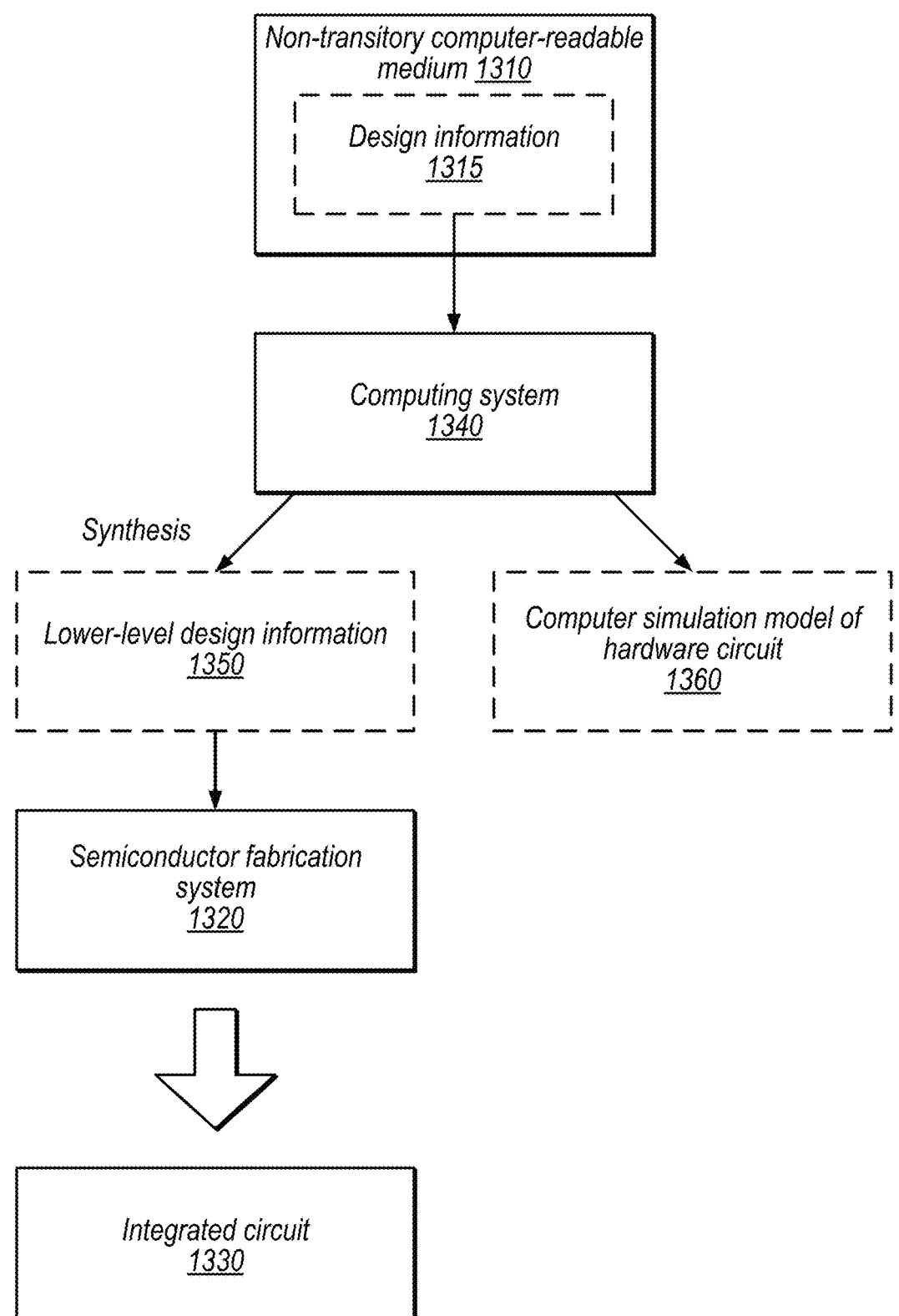
FIG. 13 is a block diagram illustrating an example computer-readable medium that stores circuit design information, according to some embodiments.

FIG. 13 is a block diagram illustrating an example non-transitory computer-readable storage medium that stores circuit design information, according to some embodiments. In the illustrated embodiment, computing system 1340 is configured to process the design information. This may include executing instructions included in the design information, interpreting instructions included in the design information, compiling, transforming, or otherwise updating the design information, etc. Therefore, the design information controls computing system 1340 (e.g., by programming computing system 1340) to perform various operations discussed below, in some embodiments.

In the illustrated example, computing system 1340 processes the design information to generate both a computer simulation model of a hardware circuit 1360 and lower-level design information 1350. In other embodiments, computing system 1340 may generate only one of these outputs, may generate other outputs based on the design information, or both. Regarding the computing simulation, computing system 1340 may execute instructions of a hardware description language that includes register transfer level (RTL) code, behavioral code, structural code, or some combination thereof. The simulation model may perform the functionality specified by the design information, facilitate verification of the functional correctness of the hardware design, generate power consumption estimates, generate timing estimates, etc.

In the illustrated example, computing system 1340 also processes the design information to generate lower-level design information 1350 (e.g., gate-level design information, a netlist, etc.). This may include synthesis operations, as shown, such as constructing a multi-level network, optimizing the network using technology-independent techniques, technology dependent techniques, or both, and outputting a network of gates (with potential constraints based on available gates in a technology library, sizing, delay, power, etc.). Based on lower-level design information 1350 (potentially among other inputs), semiconductor fabrication system 1320 is configured to fabricate an integrated circuit 1330 (which may correspond to functionality of the simulation model 1360). Note that computing system 1340 may generate different simulation models based on design information at various levels of description, including information 1350, 1315, and so on. The data representing design information 1350 and model 1360 may be stored on medium 1310 or on one or more other media.

In some embodiments, the lower-level design information 1350 controls (e.g., programs) the semiconductor fabrication system 1320 to fabricate the integrated circuit 1330. Thus, when processed by the fabrication system, the design information may program the fabrication system to fabricate a circuit that includes various circuitry disclosed herein.

Non-transitory computer-readable storage medium 1310, may comprise any of various appropriate types of memory devices or storage devices. Non-transitory computer-readable storage medium 1310 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 1310 may include other types of non-transitory memory as well or combinations thereof. Accordingly, non-transitory computer-readable storage medium 1310 may include two or more memory media; such media may reside in different locations—for example, in different computer systems that are connected over a network.

Design information 1315 may be specified using any of various appropriate computer languages, including hardware description languages such as, without limitation: VHDL, Verilog, SystemC, System Verilog, RHDL, M, MyHDL, etc. The format of various design information may be recognized by one or more applications executed by computing system 1340, semiconductor fabrication system 1320, or both. In some embodiments, design information may also include one or more cell libraries that specify the synthesis, layout, or both of integrated circuit 1330. In some embodiments, the design information is specified in whole or in part in the form of a netlist that specifies cell library elements and their connectivity. Design information discussed herein, taken alone, may or may not include sufficient information for fabrication of a corresponding integrated circuit. For example, design information may specify the circuit elements to be fabricated but not their physical layout. In this case, design information may be combined with layout information to actually fabricate the specified circuitry.

Integrated circuit 1330 may, in various embodiments, include one or more custom macrocells, such as memories, analog or mixed-signal circuits, and the like. In such cases, design information may include information related to included macrocells. Such information may include, without limitation, schematics capture database, mask design data, behavioral models, and device or transistor level netlists. Mask design data may be formatted according to graphic data system (GDSII), or any other suitable format.

Semiconductor fabrication system 1320 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1320 may also be configured to perform various testing of fabricated circuits for correct operation.

In various embodiments, integrated circuit 1330 and model 1360 are configured to operate according to a circuit design specified by design information 1315, which may include performing any of the functionality described herein. For example, integrated circuit 1330 may include any of various elements shown in at least FIGS. 1-4, 7, 8, 9, and 11. Further, integrated circuit 1330 may be configured to perform various functions described herein in conjunction with other components. Further, the functionality described herein may be performed by multiple connected integrated circuits.

As used herein, a phrase of the form "design information that specifies a design of a circuit configured to . . ." does not imply that the circuit in question must be fabricated in order for the element to be met. Rather, this phrase indicates that the design information describes a circuit that, upon being fabricated, will be configured to perform the indicated actions or will include the specified components. Similarly, stating "instructions of a hardware description programming language" that are "executable" to program a computing system to generate a computer simulation model" does not imply that the instructions must be executed in order for the element to be met, but rather specifies characteristics of the instructions. Additional features relating to the model (or the circuit represented by the model) may similarly relate to characteristics of the instructions, in this context. Therefore, an entity that sells a computer-readable medium with instructions that satisfy recited characteristics may provide an infringing product, even if another entity actually executes the instructions on the medium.

Note that a given design, at least in the digital logic context, may be implemented using a multitude of different gate arrangements, circuit technologies, etc. Once a digital logic design is specified, however, those skilled in the art need not perform substantial experimentation or research to determine those implementations. Rather, those of skill in the art understand procedures to reliably and predictably produce one or more circuit implementations that provide the function described by the design information. The different circuit implementations may affect the performance, area, power consumption, etc. of a given design (potentially with tradeoffs between different design goals), but the logical function does not vary among the different circuit implementations of the same circuit design.

In some embodiments, the instructions included in the design information instructions provide RTL information (or other higher-level design information) and are executable by the computing system to synthesize a gate-level netlist that represents the hardware circuit based on the RTL information as an input. Similarly, the instructions may provide behavioral information and be executable by the computing system to synthesize a netlist or other lower-level design information. The lower-level design information may program fabrication system 920 to fabricate integrated circuit 930.

The various techniques described herein may be performed by one or more computer programs. The term "program" is to be construed broadly to cover a sequence of instructions in a programming language that a computing device can execute. These programs may be written in any suitable computer language, including lower-level languages such as assembly and higher-level languages such as Python. The program may be written in a compiled language such as C or C++, or an interpreted language such as JavaScript.

Program instructions may be stored on a "computer-readable storage medium" or a "computer-readable medium" in order to facilitate execution of the program instructions by a computer system. Generally speaking, these phrases include any tangible or non-transitory storage or memory medium. The terms "tangible" and "non-transitory" are intended to exclude propagating electromagnetic signals, but not to otherwise limit the type of storage medium. Accordingly, the phrases "computer-readable storage medium" or a "computer-readable medium" are intended to cover types of storage devices that do not necessarily store information permanently (e.g., random access memory (RAM)). The term "non-transitory," accordingly, is a limitation on the nature of the medium itself (i.e., the medium cannot be a signal) as opposed to a limitation on data storage persistency of the medium (e.g., RAM vs. ROM).

The phrases "computer-readable storage medium" and "computer-readable medium" are intended to refer to both a storage medium within a computer system as well as a removable medium such as a CD-ROM, memory stick, or portable hard drive. The phrases cover any type of volatile memory within a computer system including DRAM, DDR RAM, SRAM, EDO RAM, Rambus RAM, etc., as well as non-volatile memory such as magnetic media, e.g., a hard drive, or optical storage. The phrases are explicitly intended to cover the memory of a server that facilitates downloading of program instructions, the memories within any intermediate computer system involved in the download, as well as the memories of all destination computing devices. Still further, the phrases are intended to cover combinations of different types of memories.

In addition, a computer-readable medium or storage medium may be located in a first set of one or more computer systems in which the programs are executed, as well as in a second set of one or more computer systems which connect to the first set over a network. In the latter instance, the second set of computer systems may provide program instructions to the first set of computer systems for execution. In short, the phrases "computer-readable storage medium" and "computer-readable medium" may include two or more media that may reside in different locations, e.g., in different computers that are connected over a network.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation-[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

The invention claimed is:
1. An apparatus, comprising:
one or more co-packaged integrated circuit dies that implement:
fabric circuitry;
multiple client circuits configured to communicate via the fabric circuitry;
interface circuitry that includes multiple interface circuits, wherein a given interface circuit is configured to couple a given client circuit to the fabric circuitry;
toggle rate detector circuitry distributed at different interface circuits and configured to measure toggle rate between a given interface circuit and the fabric circuitry;
power control circuitry configured to:
generate, for a given client circuit, an estimate of electrical current use by the given client circuit based on:
measured toggle rate between the client circuit's interface circuit and the fabric circuitry; and
one or more communications events associated with activity of the given client circuit on the fabric circuitry; and
detect, based on the estimates of electrical current use, a violation of an electrical current threshold; and limit a data rate of communications on the fabric circuitry, proportionally to an amount of the violation of the electrical current threshold.
2. The apparatus of claim 1, wherein, to limit the data rate of communications on the fabric circuitry, the power control circuitry is configured to limit the data rate for a first time period that is proportional to the amount of the violation of the electrical current threshold.
3. The apparatus of claim 1, wherein, to limit the data rate of communications on the fabric circuitry, the power control circuitry is configured to limit the data rate for a first time period that is proportional to a time duration of the violation.
4. The apparatus of claim 1, wherein the one or more communications events include at least:
memory access requests by the given client circuit; and
valid packets transmitted by the given client circuit.
5. The apparatus of claim 1, wherein the power control circuitry is further configured to:
estimate a bandwidth for the given client circuit based on the one or more communication events; and
generate the estimate of electrical current use by the given client circuit based on the bandwidth estimate.
6. The apparatus of claim 1, wherein:
the fabric circuitry includes:
switch circuitry that is shared by multiple virtual channels;
different queue circuits for different virtual channels; and
arbitration circuitry configured to arbitrate among different queue circuits; and
the limitation on the data rate provides different data rate limits for different virtual channels based on quality-of-service parameters corresponding to the different virtual channels.
7. The apparatus of claim 1, wherein the power control circuitry is further configured to:
aggregate the estimates of the electrical current use by the multiple client circuits to generate an aggregated electrical current usage estimate; and
wherein the detection is based on a comparison of the electrical current threshold and the aggregated electrical current usage estimate.
8. The apparatus of claim 1, wherein the power control circuitry includes:
centralized control circuitry; and
distributed power estimate circuitry distributed at the different interfaces and configured to:
generate the estimates of electrical current use by the given client circuits; and
report the estimates to the centralized control circuitry.
9. The apparatus of claim 8, wherein to report the estimates, the distributed power estimate circuitry is configured to:
accumulate data indicative of the electrical current use up to a pulse threshold; and
in response to the pulse threshold being met, control gated clock circuitry to output a pulse signal to the power control circuitry, wherein the power control circuitry is configured to generate estimates of electrical current use based on the pulse signals.
10. The apparatus of claim 1, wherein the power control circuitry is further configured to:
downshift a clock frequency of an input clock for a proper subset of the multiple client circuits proportionally to the amount of the violation of the electrical current threshold.

11. The apparatus of claim 1, wherein the power control circuitry is further configured to:

detect that the limitation of the data rate has not satisfied one or more criteria for addressing the violation of the electrical current threshold; and in response to the detection, perform a fallback current control procedure that includes to:

continue the limitation of the data rate; and downshift a clock frequency of an input clock for at least a portion of the fabric circuitry.

12. The apparatus of claim 1, wherein:

the power control circuitry is configured to delay the limitation of the data rate, subsequent to the detection, until a determination that one or more power delivery capacitors are not able to mitigate the violation.

13. A method, comprising:

generating, by a computing system for a given client circuit of multiple client circuits configured to communicate via fabric circuitry, an estimate of electrical current use by the given client circuit based on:

a toggle rate measured at an interface between the given client circuit and the fabric circuitry; and one or more communications events associated with activity of the given client circuit on the fabric circuitry; wherein:

a given interface circuit is configured to couple a given client circuit to the fabric circuitry; and toggle rate detector circuitry is distributed at different interface circuits and is configured to measure toggle rate between a given interface circuit and the fabric circuitry;

detecting, by the computing system based on the generated estimates for the multiple client circuits, a violation of an electrical current threshold; and limiting, by the computing system, a data rate of communications on the fabric circuitry, proportionally to an amount of the violation of the electrical current threshold.

14. The method of claim 13, further comprising:

estimating, by the computing system, a bandwidth for the given client circuit based on the one or more communication events, wherein the one or more communication events include at least memory access requests by the given client circuit and valid packets transmitted by the given client circuit; and wherein the generating the estimate of electrical current use by the given client circuit is based on the bandwidth estimate.

15. The method of claim 13, wherein the limiting includes providing different data rate limits for different virtual channels of the fabric circuitry based on quality-of-service parameters corresponding to the different virtual channels.

16. The method of claim 13, further comprising:

aggregating, by the computing system, the estimates of the electrical current use by the multiple client circuits to generate an aggregated electrical current usage estimate; and wherein the detecting is based on a comparison of the electrical current threshold and the aggregated electrical current usage estimate.

17. The method of claim 13, further comprising:

generating, by distributed power estimate circuitry of the computing system, the estimates of electrical current use by the given client circuits, wherein the distributed power estimate circuitry is distributed at the different interfaces; and reporting, by the distributed power estimate circuitry, the estimates to power management circuitry of the computing system.

18. A non-transitory computer readable storage medium having stored thereon design information that specifies a design of at least a portion of a hardware integrated circuit in a format recognized by a semiconductor fabrication system that is configured to use the design information to produce the circuit according to the design, including:

one or more co-packaged integrated circuit dies that implement:

fabric circuitry;

multiple client circuits configured to communicate via the fabric circuitry;

interface circuitry that includes multiple interface circuits, wherein a given interface circuit is configured to couple a given client circuit to the fabric circuitry;

toggle rate detector circuitry distributed at different interface circuits and configured to measure toggle rate between a given interface circuit and the fabric circuitry;

power control circuitry configured to:

generate, for a given client circuit, an estimate of electrical current use by the given client circuit based on:

measured toggle rate between the client circuit's interface circuit and the fabric circuitry; and one or more communications events associated with activity of the given client circuit on the fabric circuitry; and detect, based on the estimates of electrical current use, a violation of an electrical current threshold; and limit a data rate of communications on the fabric circuitry, proportionally to an amount of the violation of the electrical current threshold.

19. The non-transitory computer readable storage medium of claim 18, wherein, to limit the data rate of communications on the fabric circuitry, the power control circuitry is configured to limit the data rate for a first time period that is proportional to the amount of the violation of the electrical current threshold.

20. The non-transitory computer readable storage medium of claim 18, wherein the one or more communications events include at least:

memory access requests by the given client circuit; and valid packets transmitted by the given client circuit.

* * * * *